United States Patent
Saito et al.

(10) Patent No.: US 8,134,783 B2
(45) Date of Patent: Mar. 13, 2012

(54) ZOOM LENS SYSTEM AND IMAGE PICKUP APPARATUS INCLUDING THE ZOOM LENS SYSTEM

(75) Inventors: Shinichiro Saito, Utsunomiya (JP); Nobuyuki Miyazawa, Utsunomiya (JP); Tomonori Kimura, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 171 days.

(21) Appl. No.: 12/749,345

(22) Filed: Mar. 29, 2010

(65) Prior Publication Data
US 2010/0246025 A1 Sep. 30, 2010

(30) Foreign Application Priority Data
Mar. 31, 2009 (JP) ................. 2009-085555

(51) Int. Cl.
*G02B 15/14* (2006.01)
(52) U.S. Cl. .................. 359/684; 359/687; 359/676
(58) Field of Classification Search ............... 348/240.3; 359/676, 684, 686, 687, 688, 690
See application file for complete search history.

(56) References Cited

U.S. PATENT DOCUMENTS

| | | | |
|---|---|---|---|
| 6,404,561 B1 | 6/2002 | Isono et al. | |
| 6,498,687 B1 | 12/2002 | Sekita et al. | |
| 6,594,087 B2 | 7/2003 | Uzawa et al. | |
| 6,822,808 B2 | 11/2004 | Nanba et al. | |
| 7,113,347 B2 | 9/2006 | Nanba et al. | |
| 7,139,131 B2 | 11/2006 | Nanba et al. | |
| 7,215,483 B2 | 5/2007 | Sekita | |
| 7,295,381 B2 | 11/2007 | Ito | |
| 7,304,805 B2 | 12/2007 | Endo et al. | |
| 7,333,275 B2 | 2/2008 | Sekita | |
| 7,505,214 B2 | 3/2009 | Hamano et al. | |
| 7,672,066 B2 * | 3/2010 | Ohashi | 359/774 |
| 7,933,074 B2 * | 4/2011 | Takano et al. | 359/687 |
| 2009/0080088 A1 | 3/2009 | Ohashi | |
| 2011/0176223 A1 * | 7/2011 | Tashiro | 359/683 |
| 2011/0254994 A1 * | 10/2011 | Saito et al. | 348/340 |

FOREIGN PATENT DOCUMENTS

JP 2004-061675 A 2/2004
JP 2008-191286 A 8/2008

* cited by examiner

*Primary Examiner* — David N Spector
(74) *Attorney, Agent, or Firm* — Canon U.S.A., Inc. IP Division

(57) ABSTRACT

A zoom lens system, in which chromatic aberration, spherical aberration, and coma may be excellently corrected in a balanced manner so as to obtain excellent optical performance over an entire zoom range, includes, in order from an object side to an image side: a first lens unit having a positive refractive power; a second lens unit having a negative refractive power; and a rear lens group including a lens unit having a positive refractive power, in which: at least one of the first lens unit and the second lens unit is moved for zooming so that an interval therebetween at a telephoto end is larger than an interval at a wide angle end; the first lens unit includes at least one negative lens; and an Abbe number (vd1n) and a partial dispersion ratio (θgF1n) of a material of the at least one negative lens are appropriately set.

14 Claims, 19 Drawing Sheets

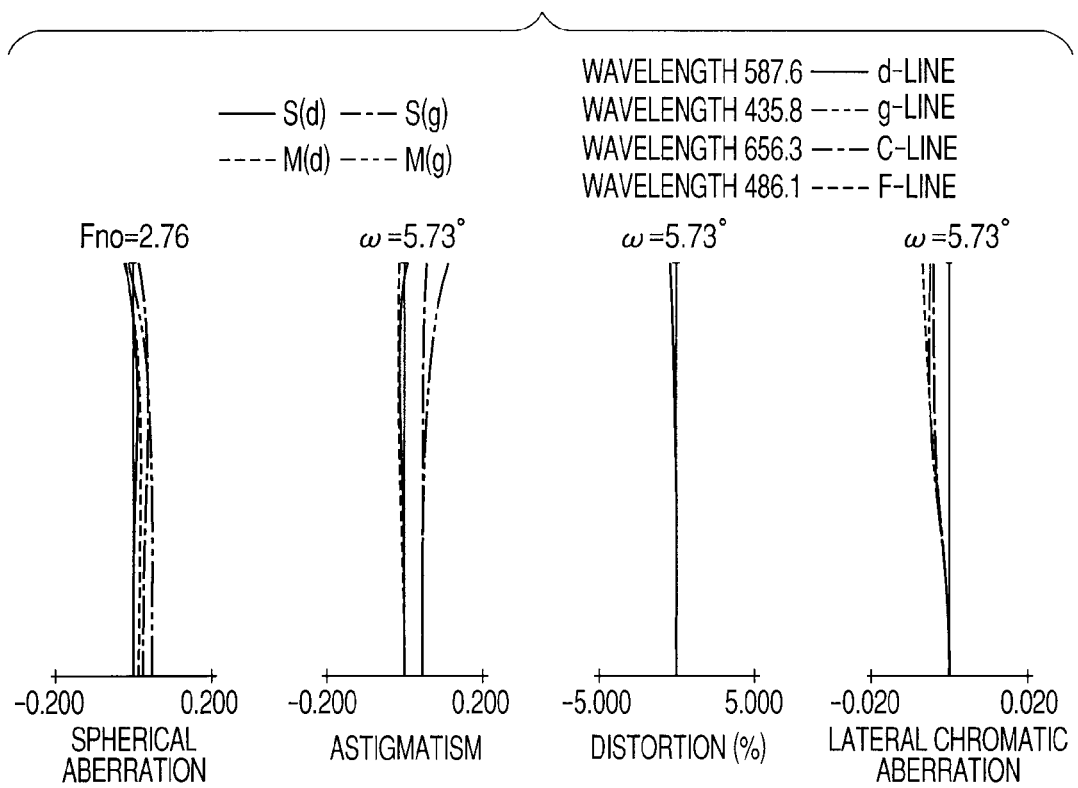
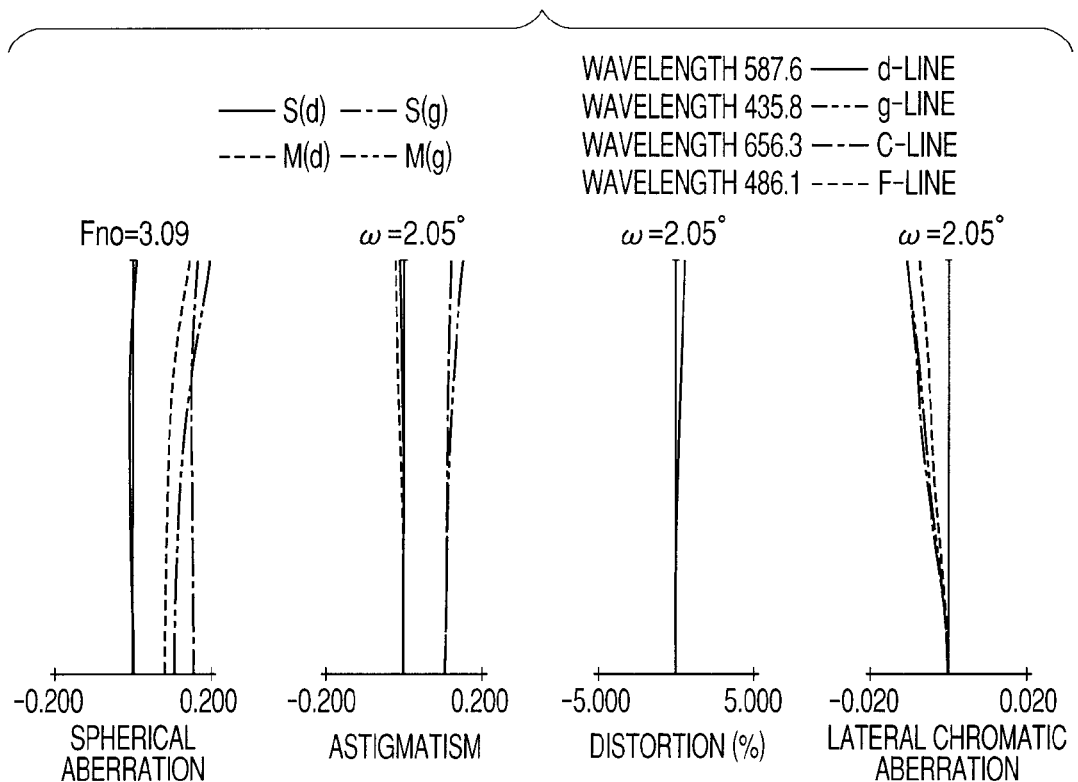

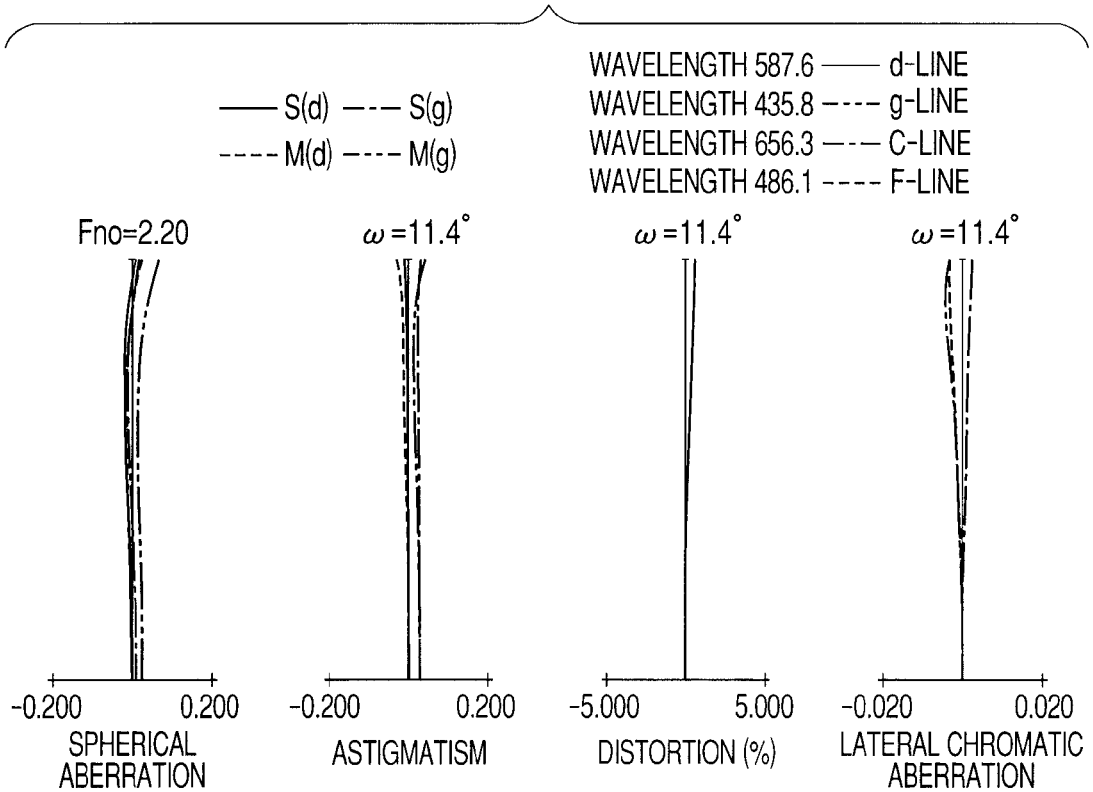
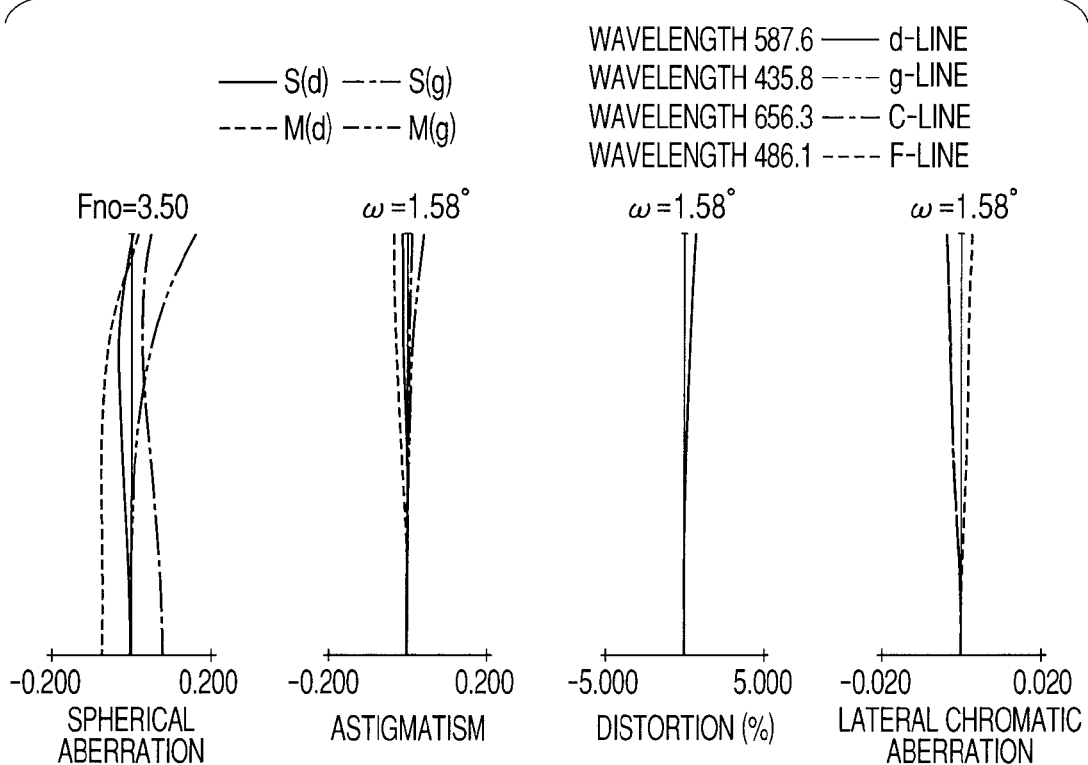

ZOOM LENS SYSTEM AND IMAGE PICKUP APPARATUS INCLUDING THE ZOOM LENS SYSTEM

BACKGROUND OF THE INVENTION

1. Field of the Invention

The present invention relates to a zoom lens system and an image pickup apparatus including the zoom lens system, and more particularly, to a zoom lens system and an image pickup apparatus including the zoom lens system, which are suitable for an image pickup optical system used for a still camera, a video camera, a digital still camera, a TV camera, or a monitoring camera.

2. Description of the Related Art

In recent years, the number of pixels of an image pickup element used for an image pickup apparatus such as a digital camera or a video camera has been increased. An image taking lens system used for the image pickup apparatus including the image pickup element is required to be a zoom lens system in which not only monochromatic aberrations such as spherical aberration and coma but also chromatic aberration are excellently corrected. A high zoom ratio is also required. In particular, a zoom lens system having a long focal length on a telephoto side and a high zoom ratio is required to have an excellently corrected secondary spectrum.

A positive-lead zoom lens system has been known as the zoom lens system having the high zoom ratio. The positive-lead zoom lens system includes, in order from an object side to an image side, a first lens unit having a positive refractive power, a second lens unit having a negative refractive power, and a rear lens group including a lens unit having a positive refractive power. As a positive-lead zoom lens system in which a lens unit having a positive refractive power is located closest to the object side, there has been known a zoom lens system in which at least four lens units are provided and an anomalous dispersion material is used as a lens material of a first lens unit to excellently correct a secondary spectrum of chromatic aberration (U.S. Pat. No. 6,594,087). With respect to a four-unit zoom lens system including a first lens unit having a positive refractive power, a second lens unit having a negative refractive power, a third lens unit having a positive refractive power, and a fourth lens unit having a positive refractive power, which are provided in order from the object side, there has been known a zoom lens system using a lens made of a material having low dispersion and anomalous dispersion for the first lens unit (U.S. Pat. No. 7,139,131 and U.S. Pat. No. 6,404,561). With respect to a five-unit zoom lens system including a first lens unit having a positive refractive power, a second lens unit having a negative refractive power, a third lens unit having a positive refractive power, a fourth lens unit having a negative refractive power, and a fifth lens unit having a positive refractive power, which are provided in order from the object side, there has been known a zoom lens system using a lens made of a material having anomalous dispersion for the first lens unit (U.S. Pat. No. 7,304,805 and U.S. Pat. No. 7,505,214). Further, there has been known a zoom lens system in which chromatic aberration is reduced by a replica layer made of a transparent resin having anomalous dispersion (Japanese Patent Application Laid-Open No. 2008-191286).

The positive-lead zoom lens system is relatively easy to realize a high zoom ratio while the entire system is reduced in size. However, the secondary spectrum of axial chromatic aberration increases in a zoom range on the telephoto side. In the four-unit zoom lens system or the five-unit zoom lens system as described above, an incident beam height of the first lens unit is large in a zoom range on the telephoto side, and hence the axial chromatic aberration is generated mainly in the first lens unit. In this case, in order to reduce the secondary spectrum to correct the axial chromatic aberration, it is important to use the first lens unit in which a height of the paraxial ray is large in the zoom range on the telephoto side. In order to reduce the secondary spectrum of the axial chromatic aberration in the first lens unit, it is effective to use a material having low dispersion and anomalous dispersion for a lens included in the first lens unit.

However, a normal optical material having low dispersion and anomalous dispersion has a low refractive index as in a typical case of fluorite. Therefore, when a refractive power of the lens is to be changed to desirably correct the secondary spectrum, it is necessary to significantly adjust a curvature of the lens. The height of the paraxial ray of the first lens unit of the positive-lead zoom lens system is large at the telephoto end, and hence not only the axial chromatic aberration but also spherical aberration and coma are generated more. Thus, when only the optical material having low dispersion and anomalous dispersion or only a resin material having a low refractive index is used, it is difficult to excellently correct chromatic aberration, spherical aberration, and coma at the telephoto end. In order to excellently correct the chromatic aberration, the spherical aberration, and the coma, the number of lenses included in the first lens unit may be increased. However, when the number of lenses of the first lens unit increases, the entire lens length is more likely to be increased.

SUMMARY OF THE INVENTION

A zoom lens system according to the present invention includes, in order from an object side to an image side: a first lens unit having a positive refractive power; a second lens unit having a negative refractive power; and a rear lens group including a lens unit having a positive refractive power, in which: at least one of the first lens unit and the second lens unit is moved for zooming so that an interval between the first lens unit and the second lens unit at a telephoto end is larger than an interval between the first lens unit and the second lens unit at a wide angle end; the first lens unit includes at least one negative lens; and the following conditions are satisfied:

$$-1.68 \times 10^{-3} \times vd1n + 0.585 < \theta gF1n < 3.15 \times 10^{-4} \times vd1n^2 - 1.86 \times 10^{-2} \times vd1n + 0.878; \text{ and}$$

$$5 < vd1n < 27,$$

where $vd1n$ and $\theta gF1n$ represent an Abbe number and a partial dispersion ratio of a material of the at least one negative lens, respectively.

According to the present invention, chromatic aberration, spherical aberration, and coma may be excellently corrected in a balanced manner, and hence a zoom lens system having excellent optical performance over the entire zoom range is obtained.

Further features of the present invention become apparent from the following description of exemplary embodiments with reference to the attached drawings.

BRIEF DESCRIPTION OF THE DRAWINGS

FIG. 1 is a lens cross sectional view illustrating a zoom lens system according to Embodiment 1 of the present invention at a wide angle end.

FIGS. 2A, 2B, and 2C are aberration graphs in the zoom lens system according to Embodiment 1 of the present invention.

FIGS. 4A, 4B, and 4C are aberration graphs in the zoom lens system according to Embodiment 2 of the present invention.

DESCRIPTION OF THE EMBODIMENTS

Hereinafter, exemplary embodiments of the present invention are described in detail with reference to the attached drawings.

A zoom lens system according to the present invention includes, in order from an object side to an image side, a first lens unit having a positive refractive power, a second lens unit having a negative refractive power, and rear lens group including a lens unit having a positive refractive power. During zooming, intervals between the respective lens units change such that an interval between the first lens unit and the second lens unit at a telephoto end is larger than an interval between the first lens unit and the second lens unit at a wide angle end. The first lens unit includes at least one negative lens. The at least one negative lens is made of a material satisfying Conditional Expressions (1) and (2) described later.

Figures 1, 2A:
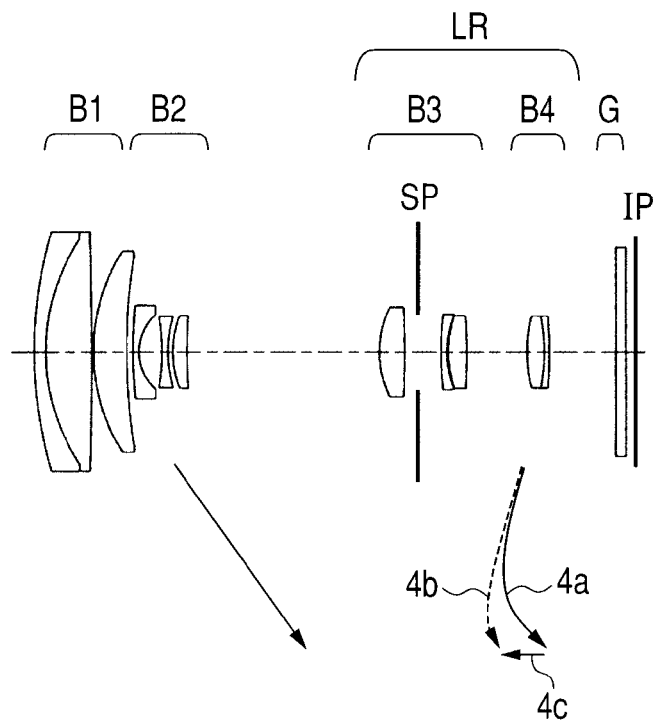
Figure 3:
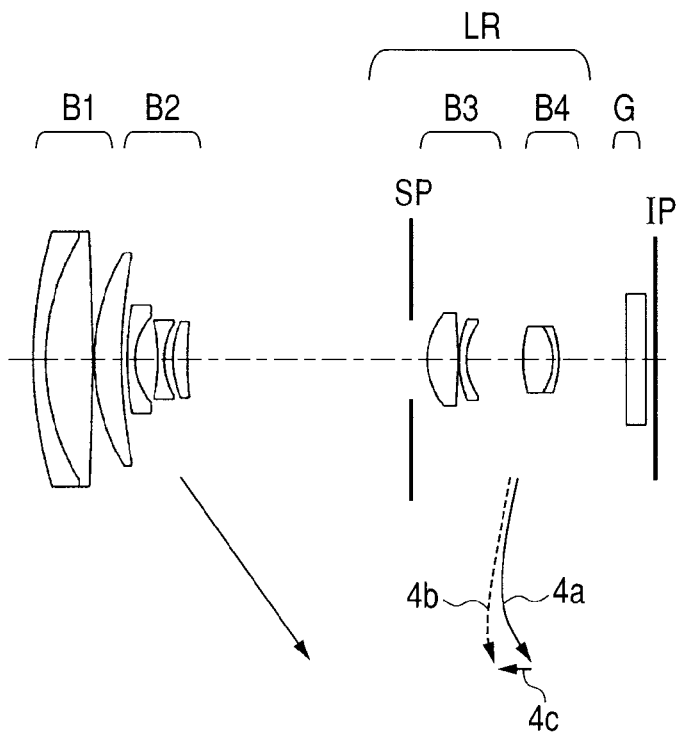
FIG. 3 is a lens cross sectional view illustrating a zoom lens system according to Embodiment 2 of the present invention at the wide angle end.
Figure 4A:
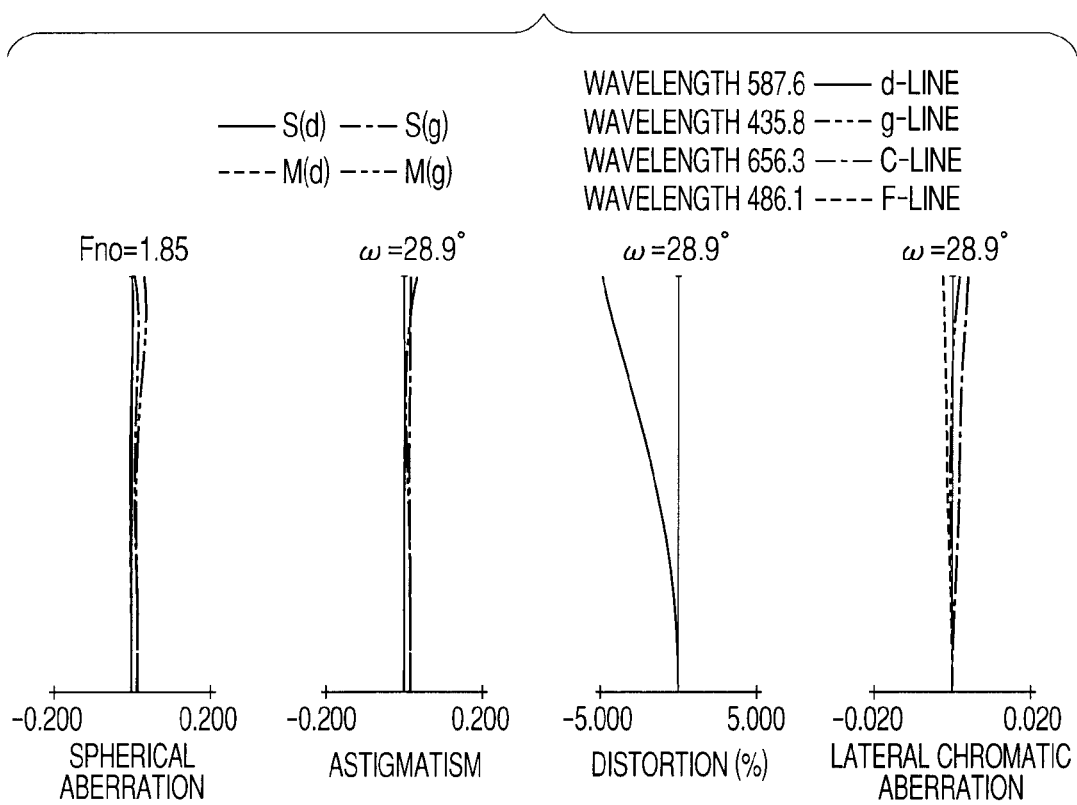
Figure 5:
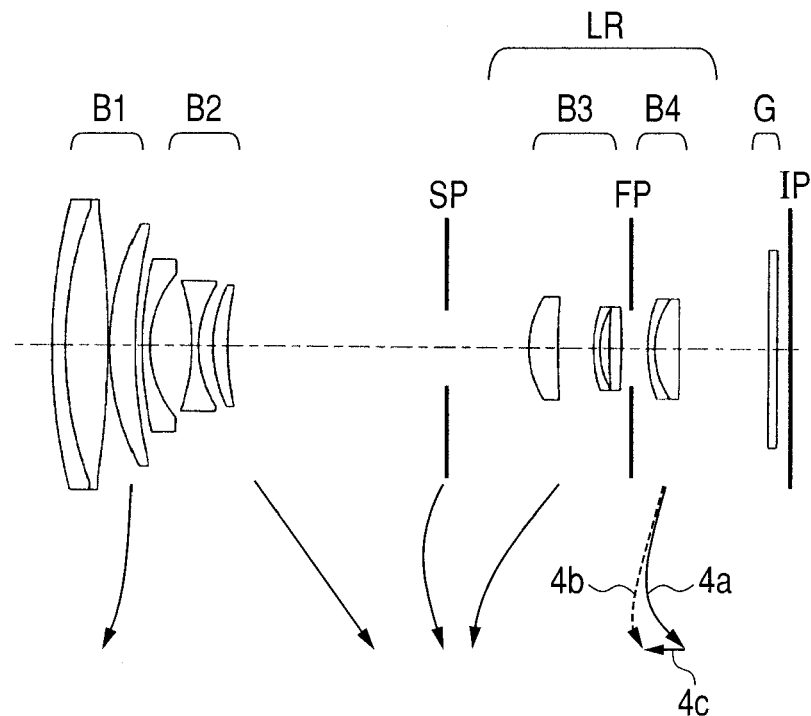
FIG. 5 is a lens cross sectional view illustrating a zoom lens system according to Embodiment 3 of the present invention at the wide angle end.
Figure 6A:
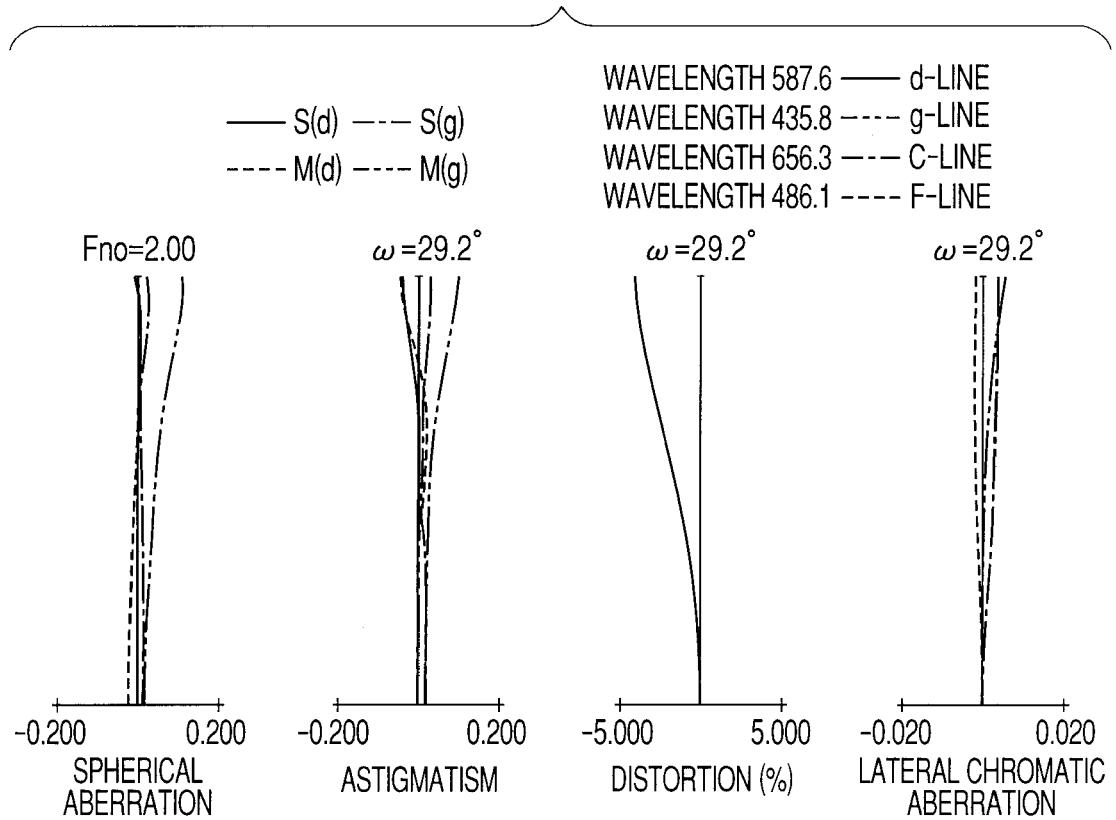
FIGS. 6A, 6B, and 6C are aberration graphs in the zoom lens system according to Embodiment 3 of the present invention.
Figure 6B:
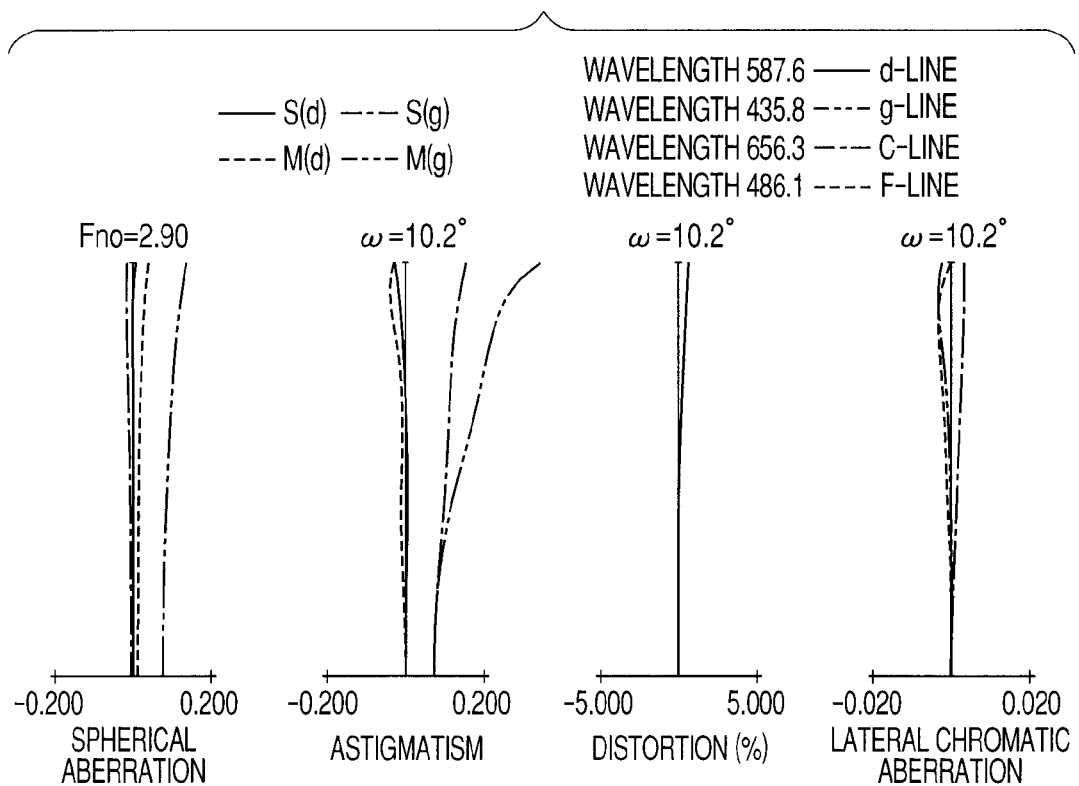
Figure 6C:
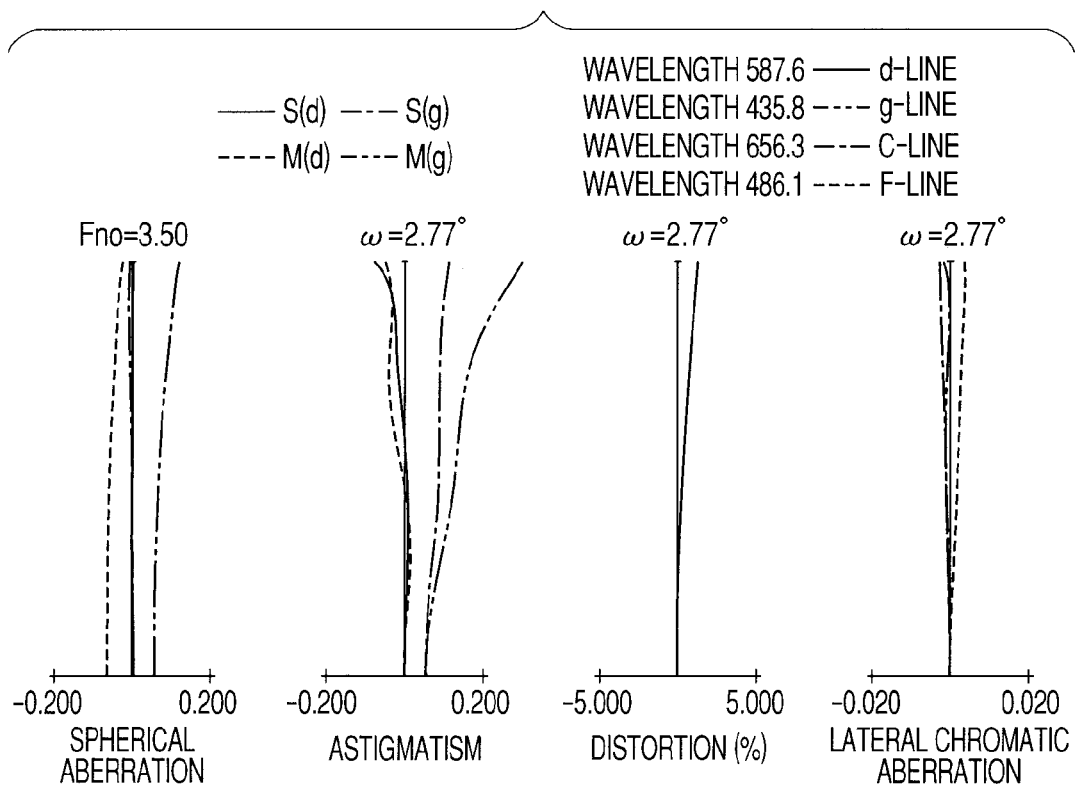
Figure 7:
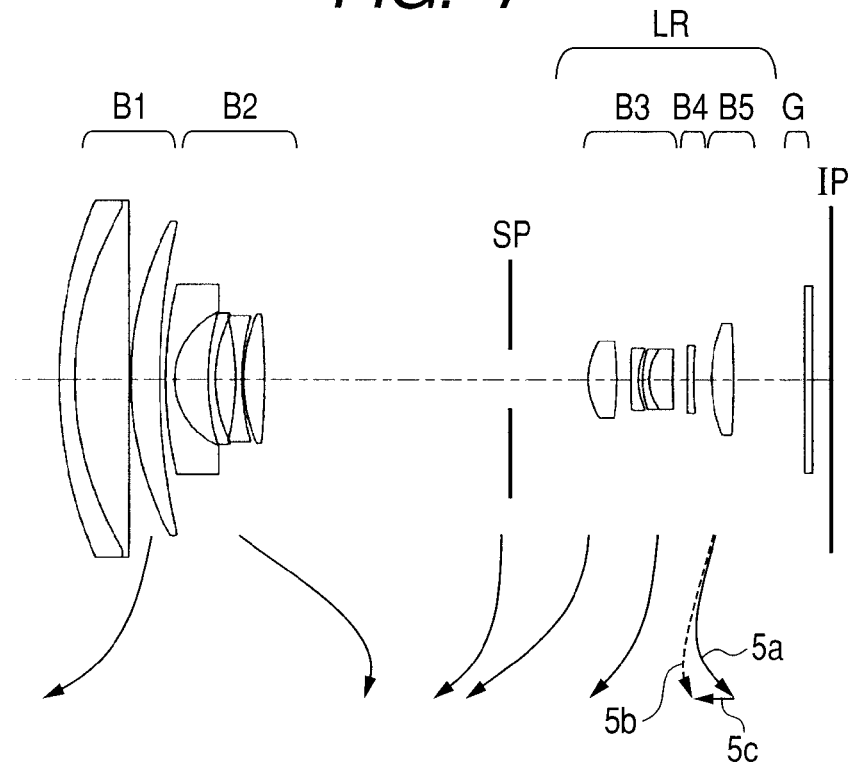
FIG. 7 is a lens cross sectional view illustrating a zoom lens system according to Embodiment 4 of the present invention at the wide angle end.
Figure 8A:
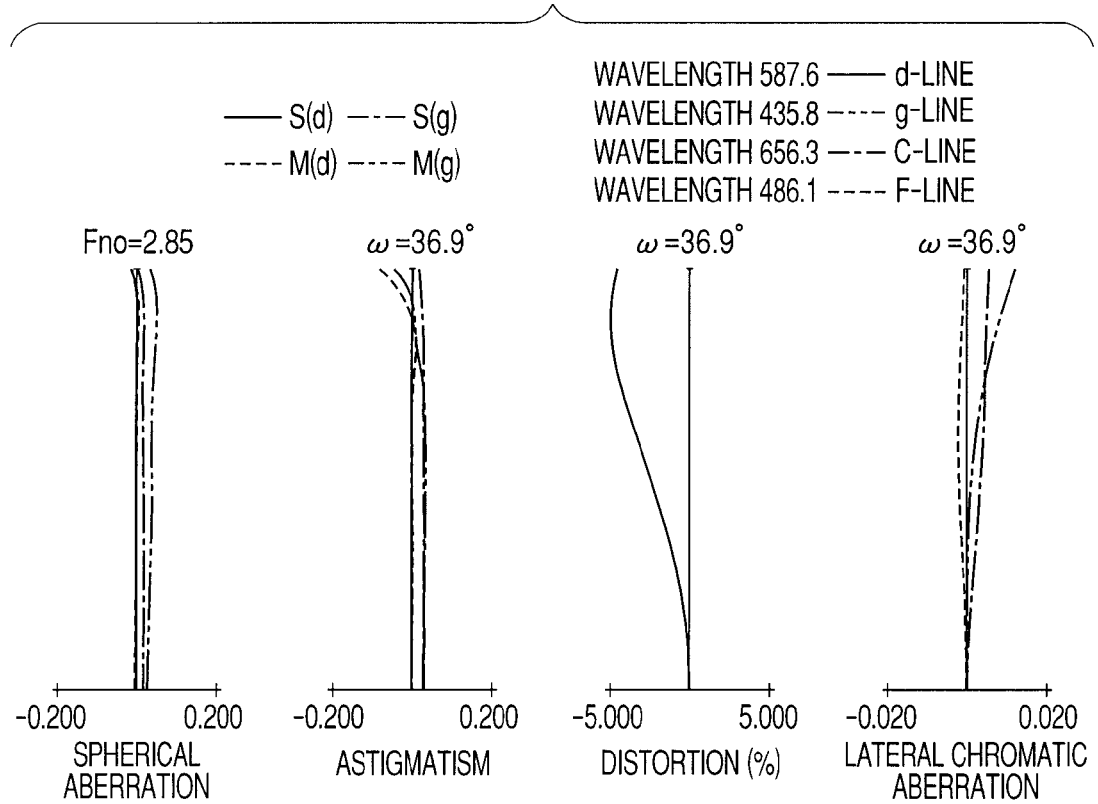
FIGS. 8A, 8B, and 8C are aberration graphs in the zoom lens system according to Embodiment 4 of the present invention.
Figure 8B:
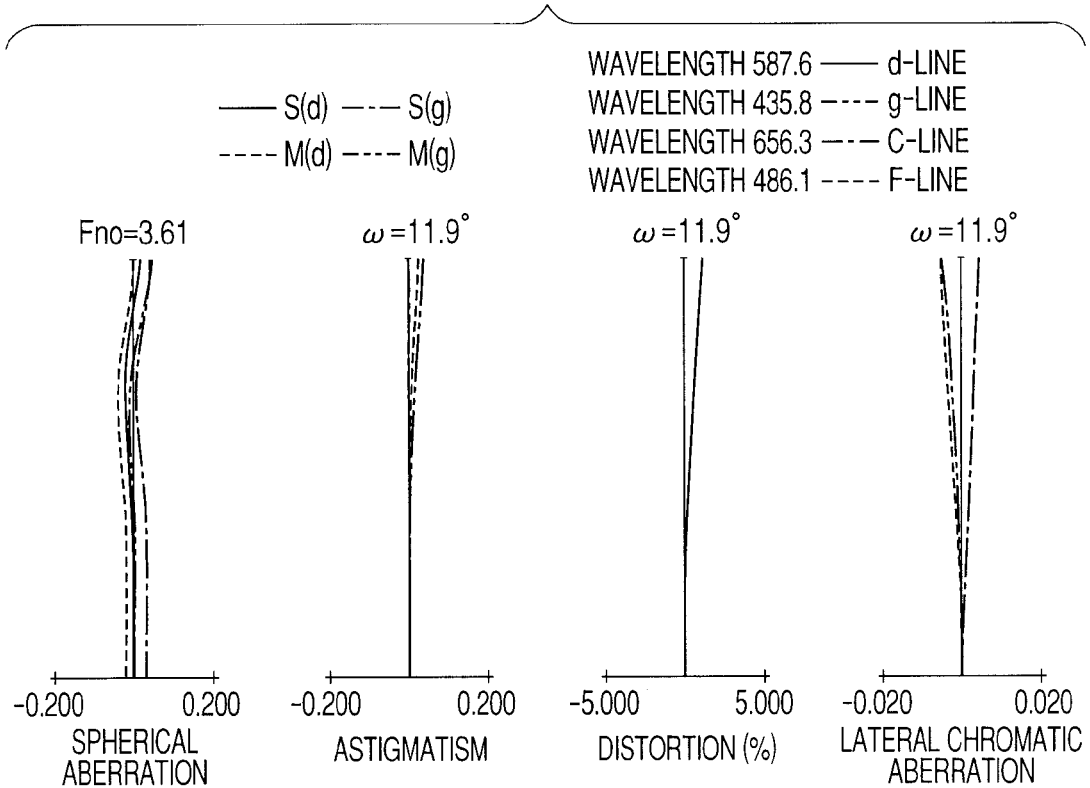
Figure 8C:
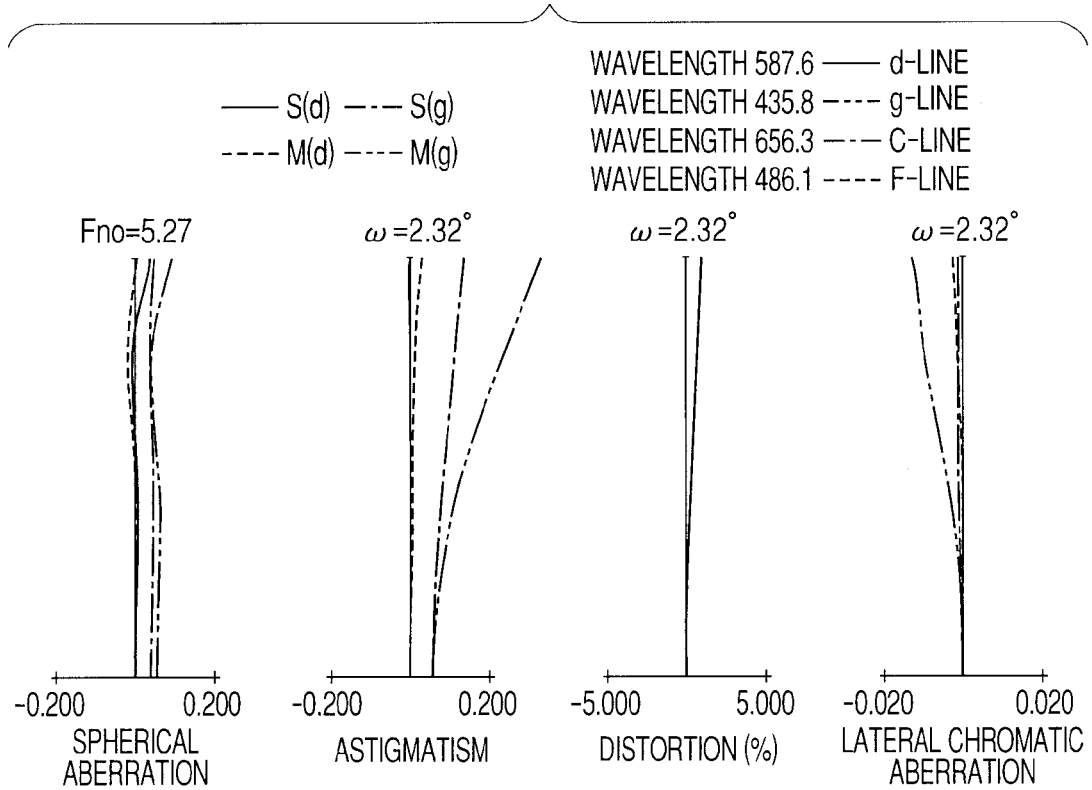

FIG. 1 is a lens cross sectional view illustrating a zoom lens system according to Embodiment 1 of the present invention at a wide angle end (short-focal length end). FIGS. 2A, 2B, and 2C are aberration graphs in the zoom lens system according to Embodiment 1 at the wide angle end, an intermediate zoom position, and the telephoto end (long-focal length end), respectively. FIG. 3 is a lens cross sectional view illustrating a zoom lens system according to Embodiment 2 of the present invention at the wide angle end. FIGS. 4A, 4B, and 4C are aberration graphs in the zoom lens system according to Embodiment 2 at the wide angle end, the intermediate zoom position, and the telephoto end, respectively. FIG. 5 is a lens cross sectional view illustrating a zoom lens system according to Embodiment 3 of the present invention at the wide angle end. FIGS. 6A, 6B, and 6C are aberration graphs in the zoom lens system according to Embodiment 3 at the wide angle end, the intermediate zoom position, and the telephoto end, respectively. FIG. 7 is a lens cross sectional view illustrating a zoom lens system according to Embodiment 4 of the present invention at the wide angle end. FIGS. 8A, 8B, and 8C are aberration graphs in the zoom lens system according to Embodiment 4 at the wide angle end, the intermediate zoom position, and the telephoto end, respectively.

Figure 9:
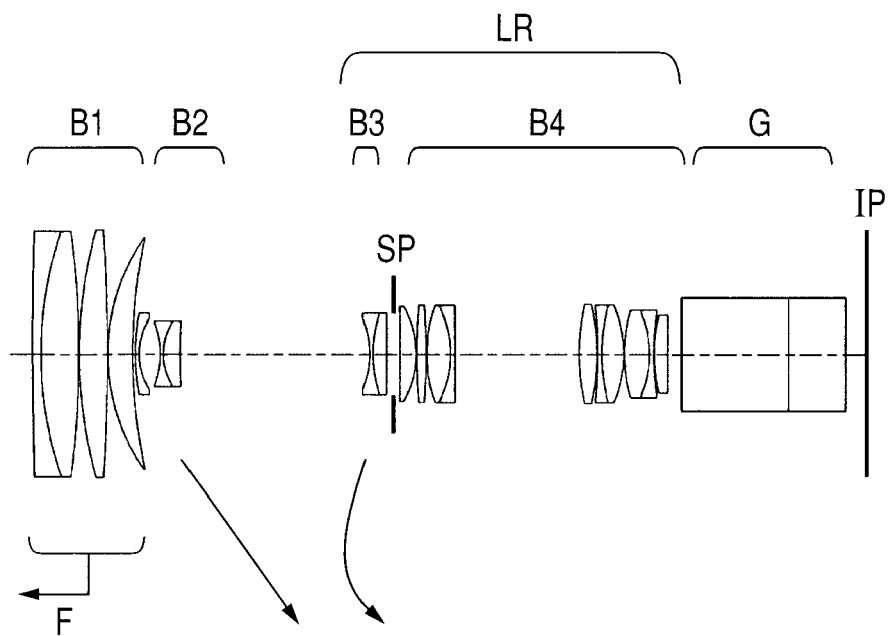
FIG. 9 is a lens cross sectional view illustrating a zoom lens system according to Embodiment 5 of the present invention at the wide angle end.
Figure 10A:
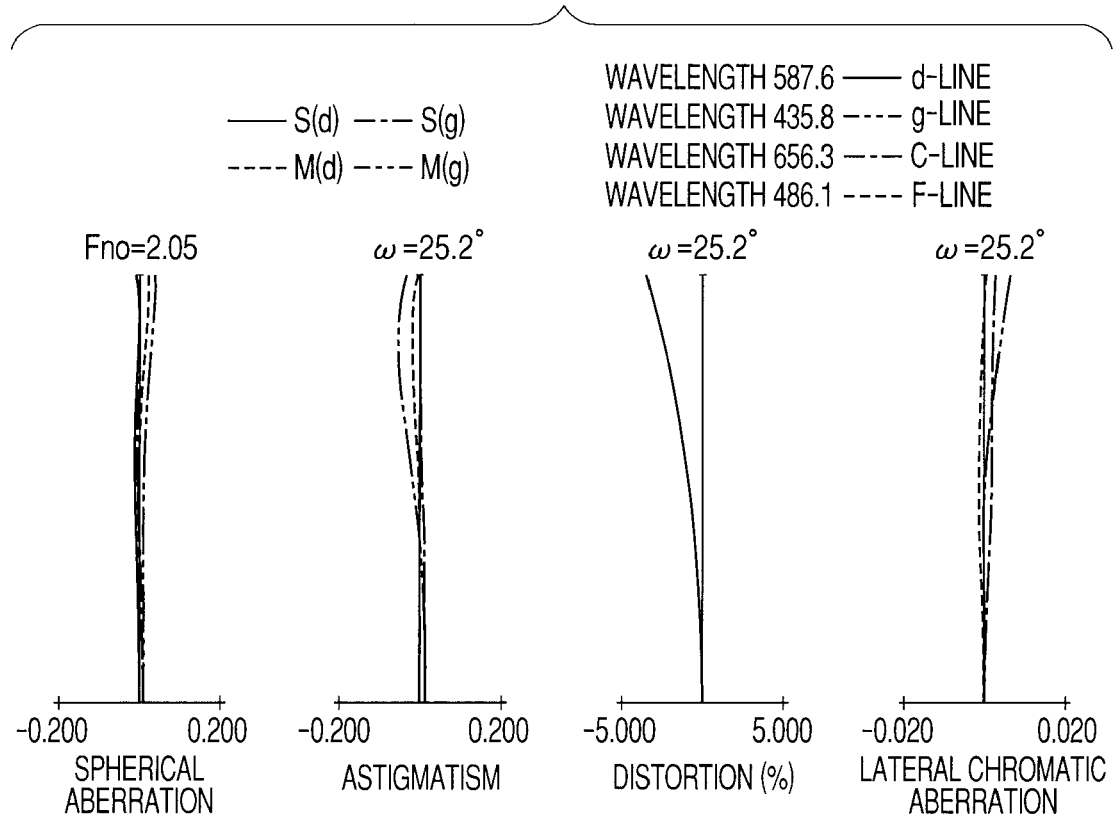
FIGS. 10A, 10B, and 10C are aberration graphs in the zoom lens system according to Embodiment 5 of the present invention.
Figure 10B:
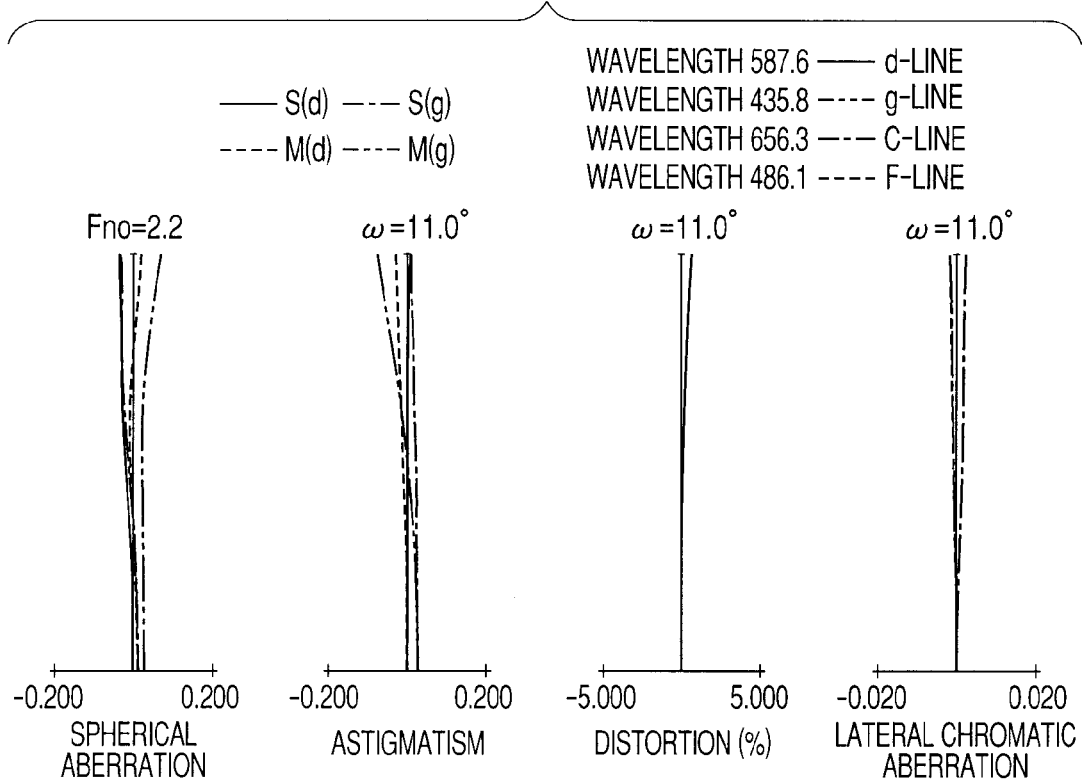
Figure 10C:
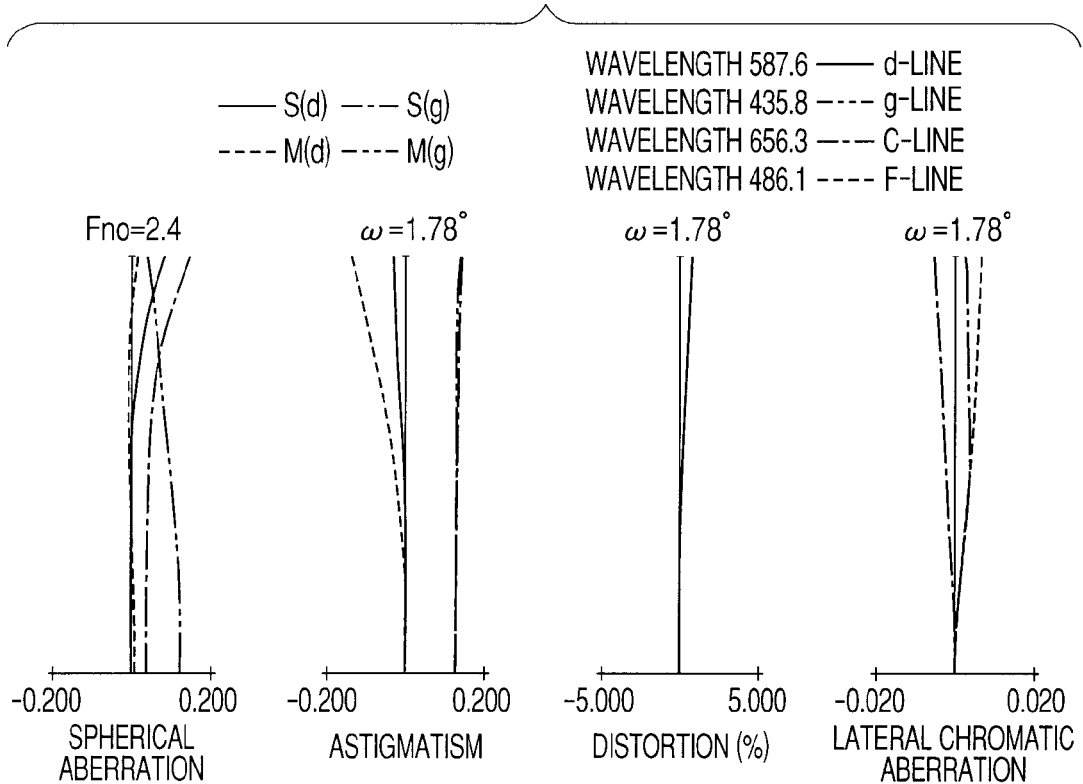
Figure 11:
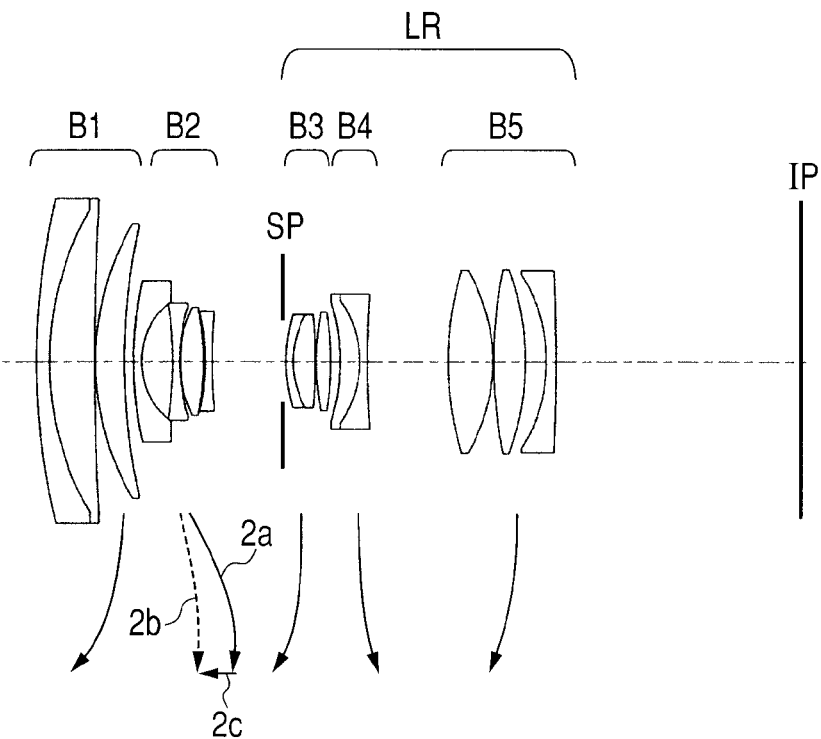
FIG. 11 is a lens cross sectional view illustrating a zoom lens system according to Embodiment 6 of the present invention at the wide angle end.
Figure 12A:
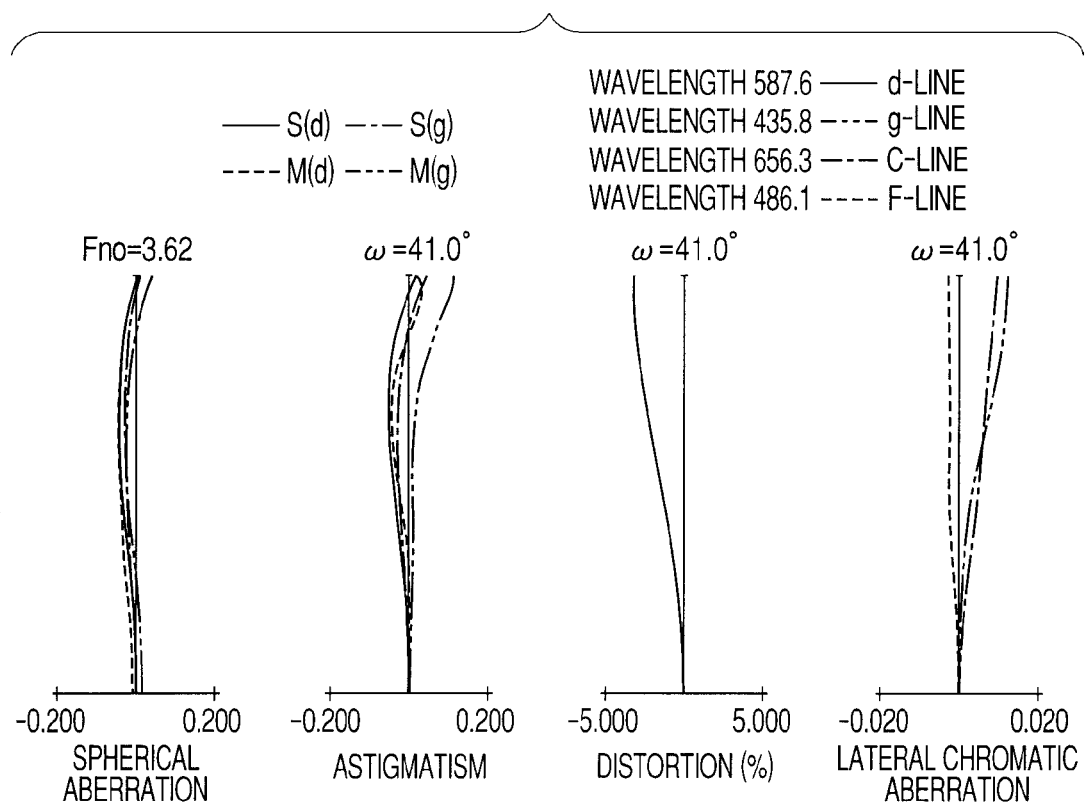
FIGS. 12A, 12B, and 12C are aberration graphs in the zoom lens system according to Embodiment 6 of the present invention.
Figure 12B:
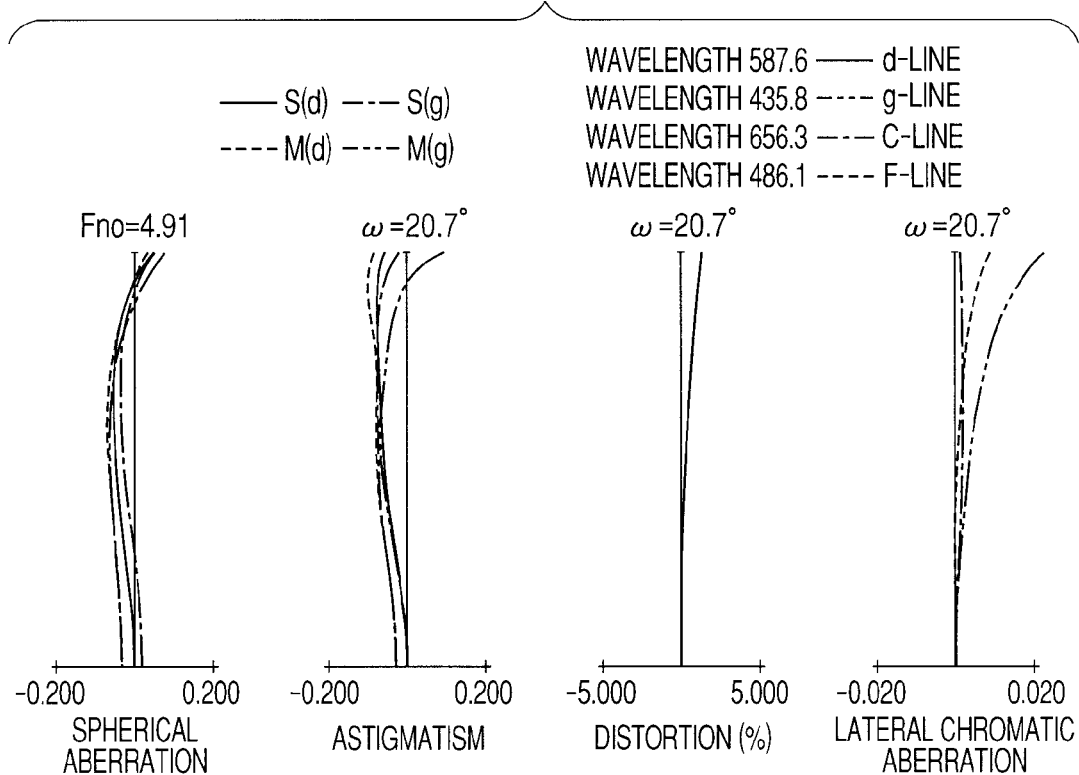
Figure 12C:
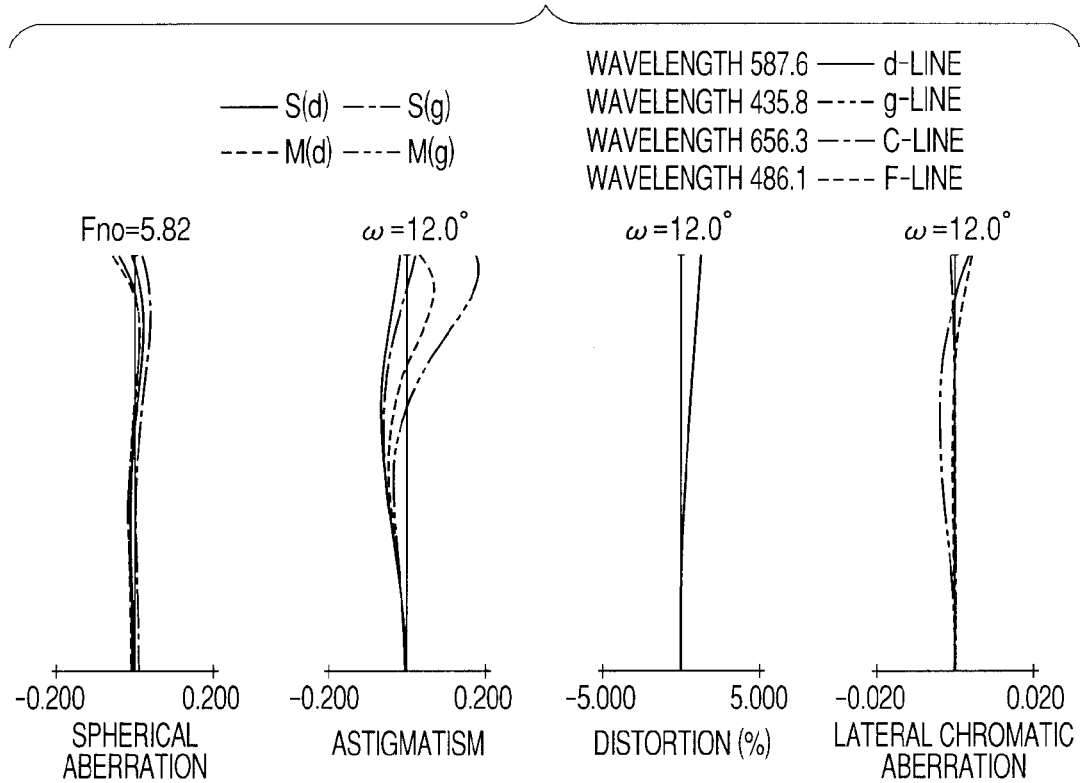
Figure 13:
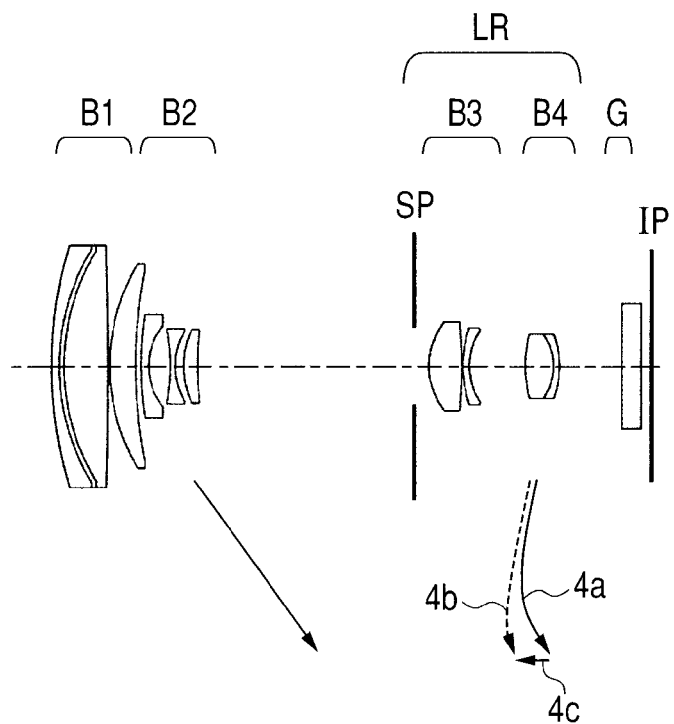
FIG. 13 is a lens cross sectional view illustrating a zoom lens system according to Embodiment 7 of the present invention at the wide angle end.
Figure 14A:
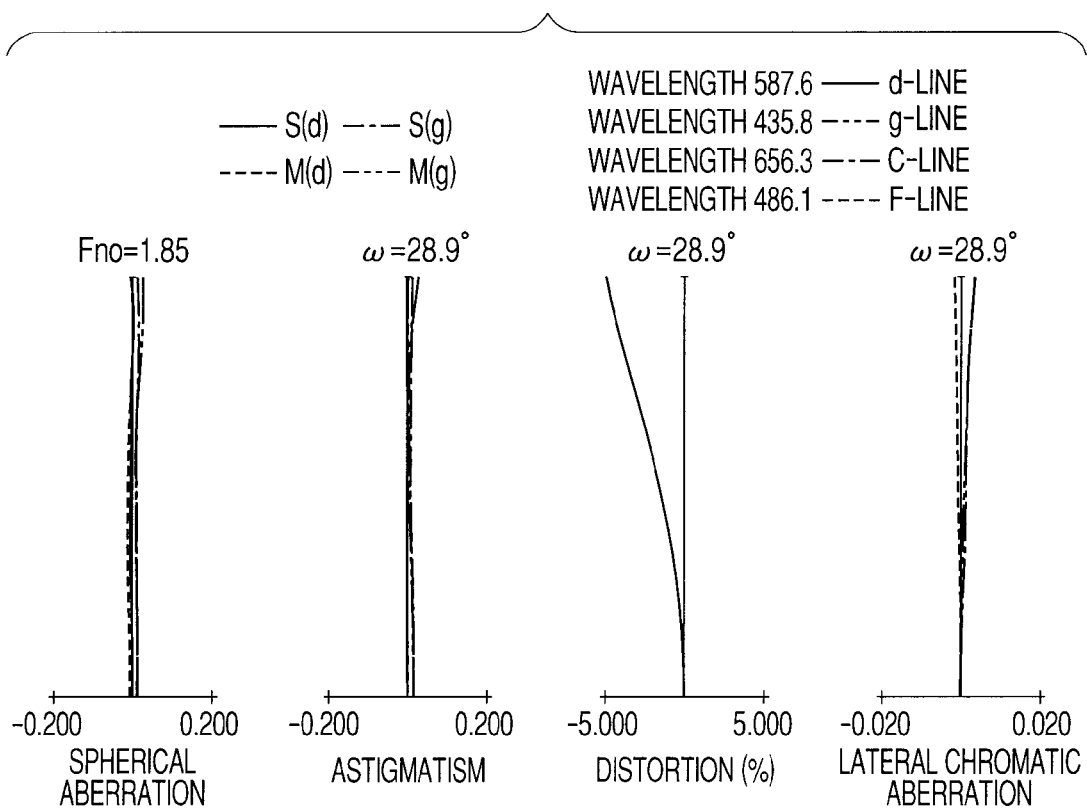
FIGS. 14A, 14B, and 14C are aberration graphs in the zoom lens system according to Embodiment 7 of the present invention.
Figure 14B:
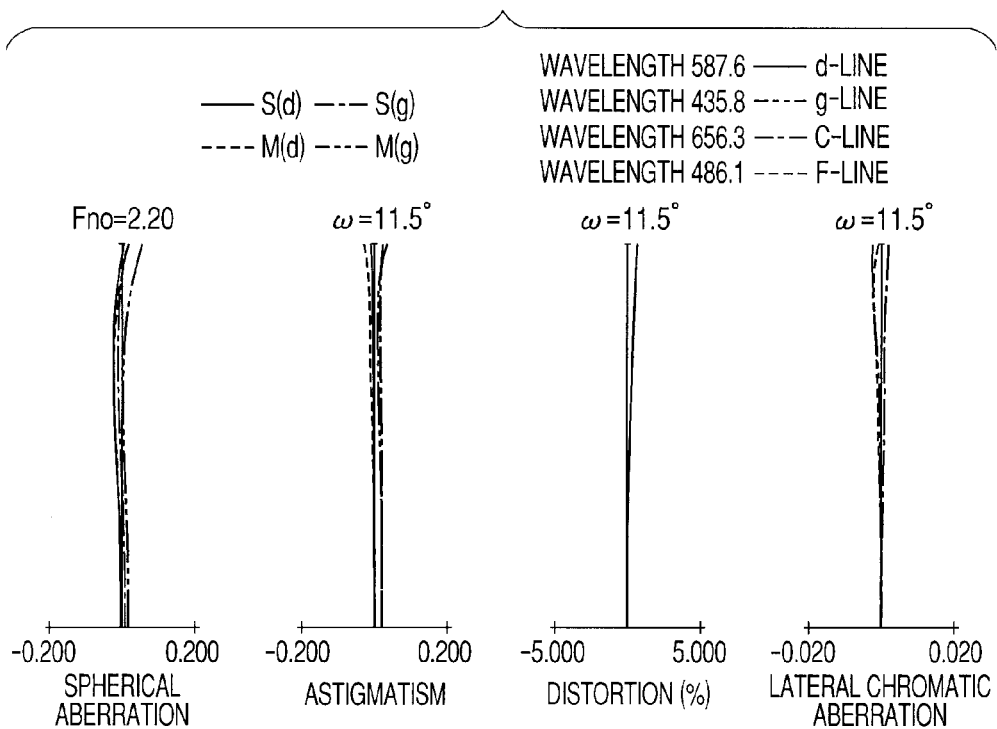
Figure 14C:
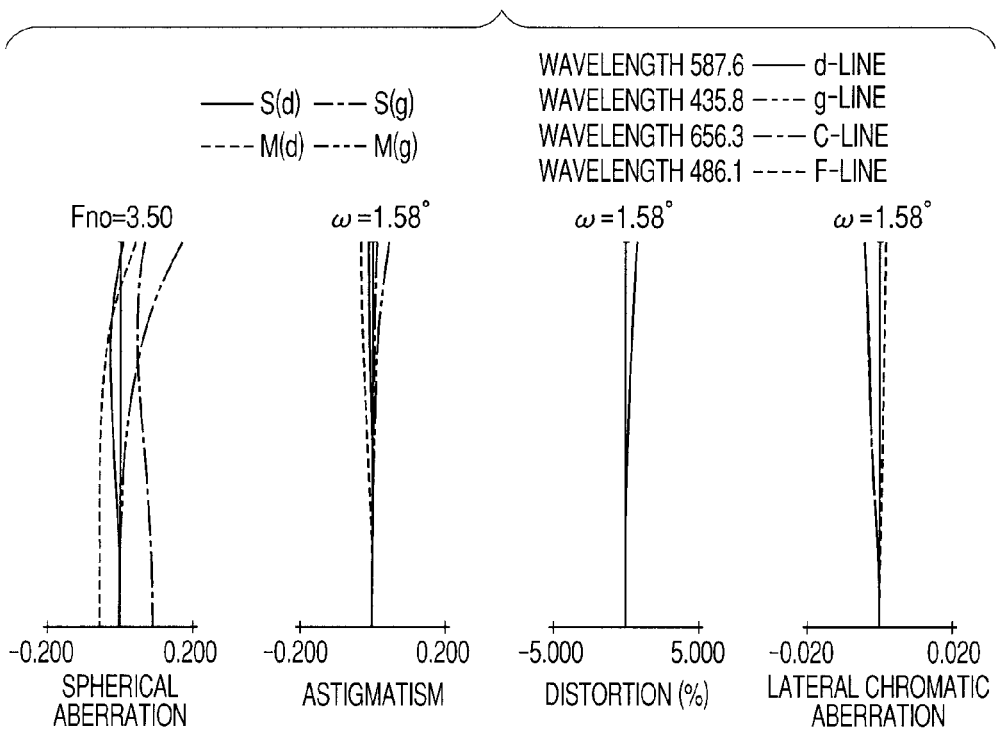
Figure 15:
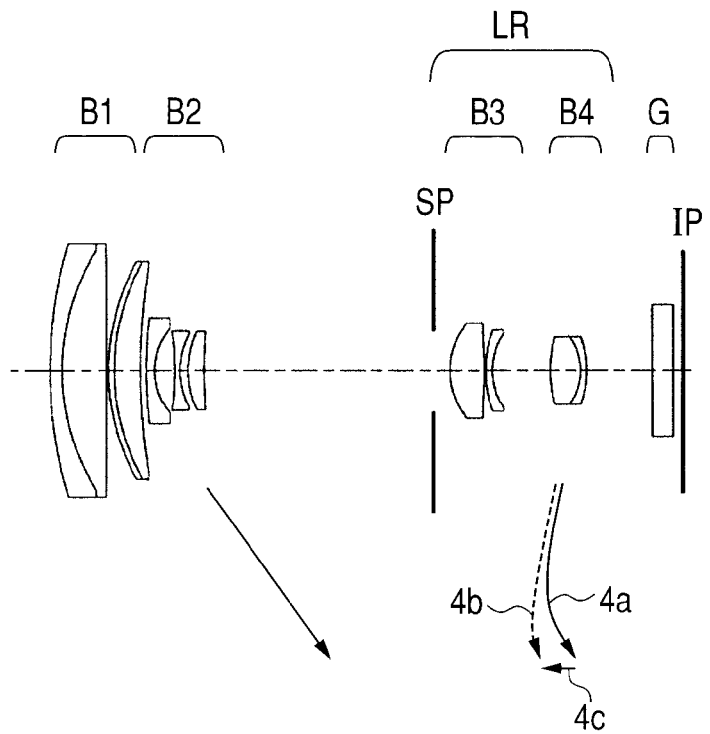
FIG. 15 is a lens cross sectional view illustrating a zoom lens system according to Embodiment 8 of the present invention at the wide angle end.
Figure 16A:
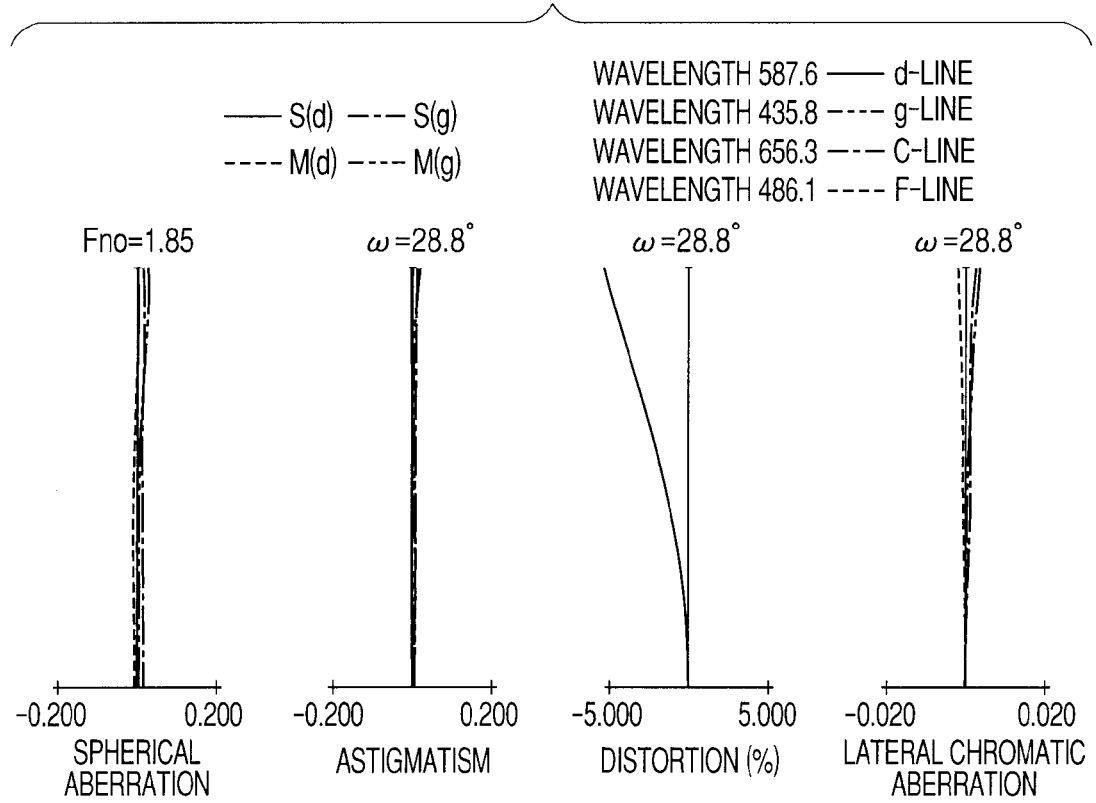
FIGS. 16A, 16B, and 16C are aberration graphs in the zoom lens system according to Embodiment 8 of the present invention.
Figure 16B:
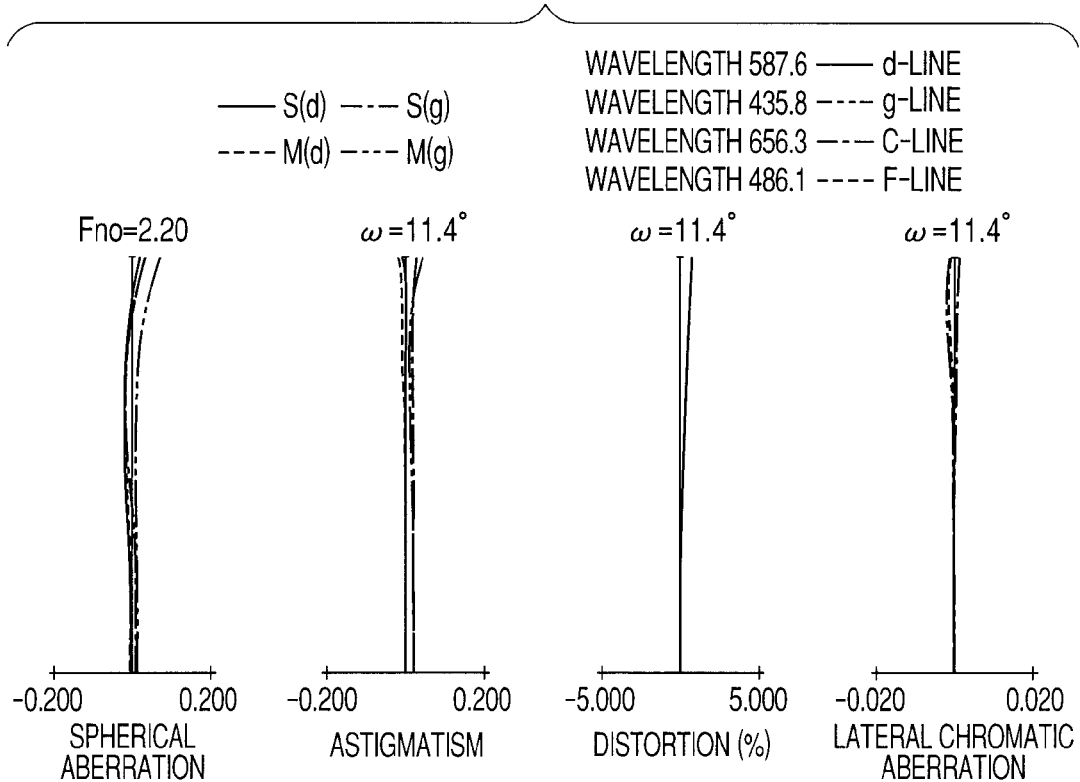
Figure 16C:
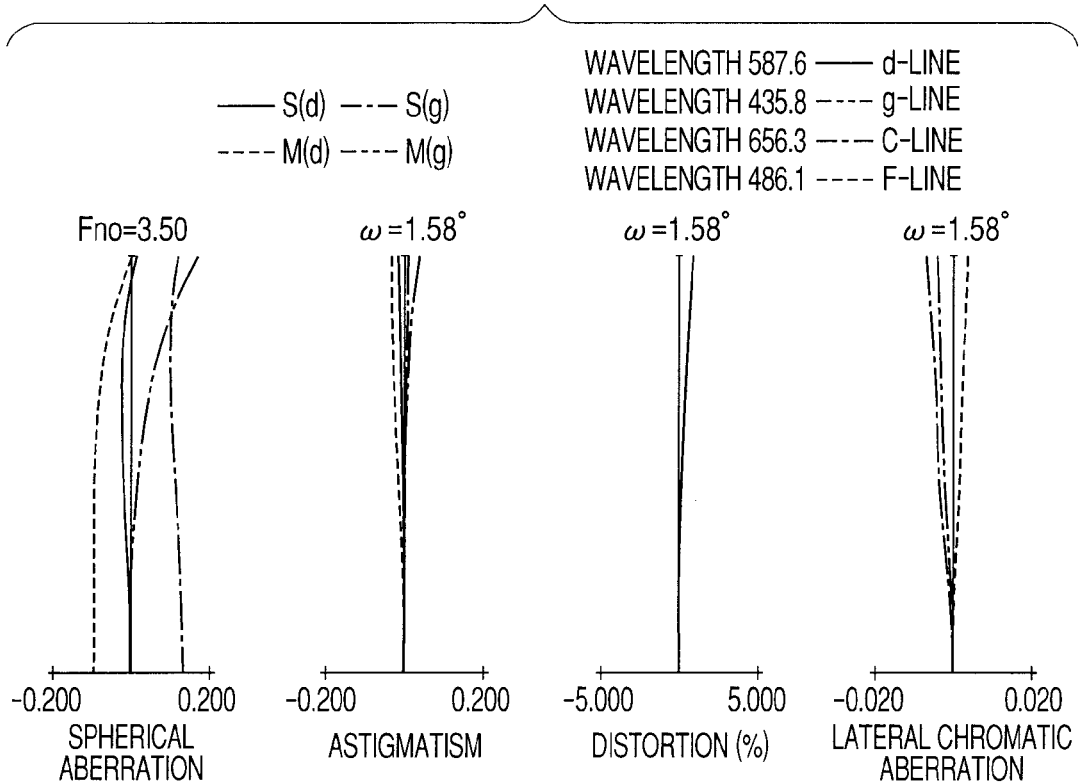
Figure 17:
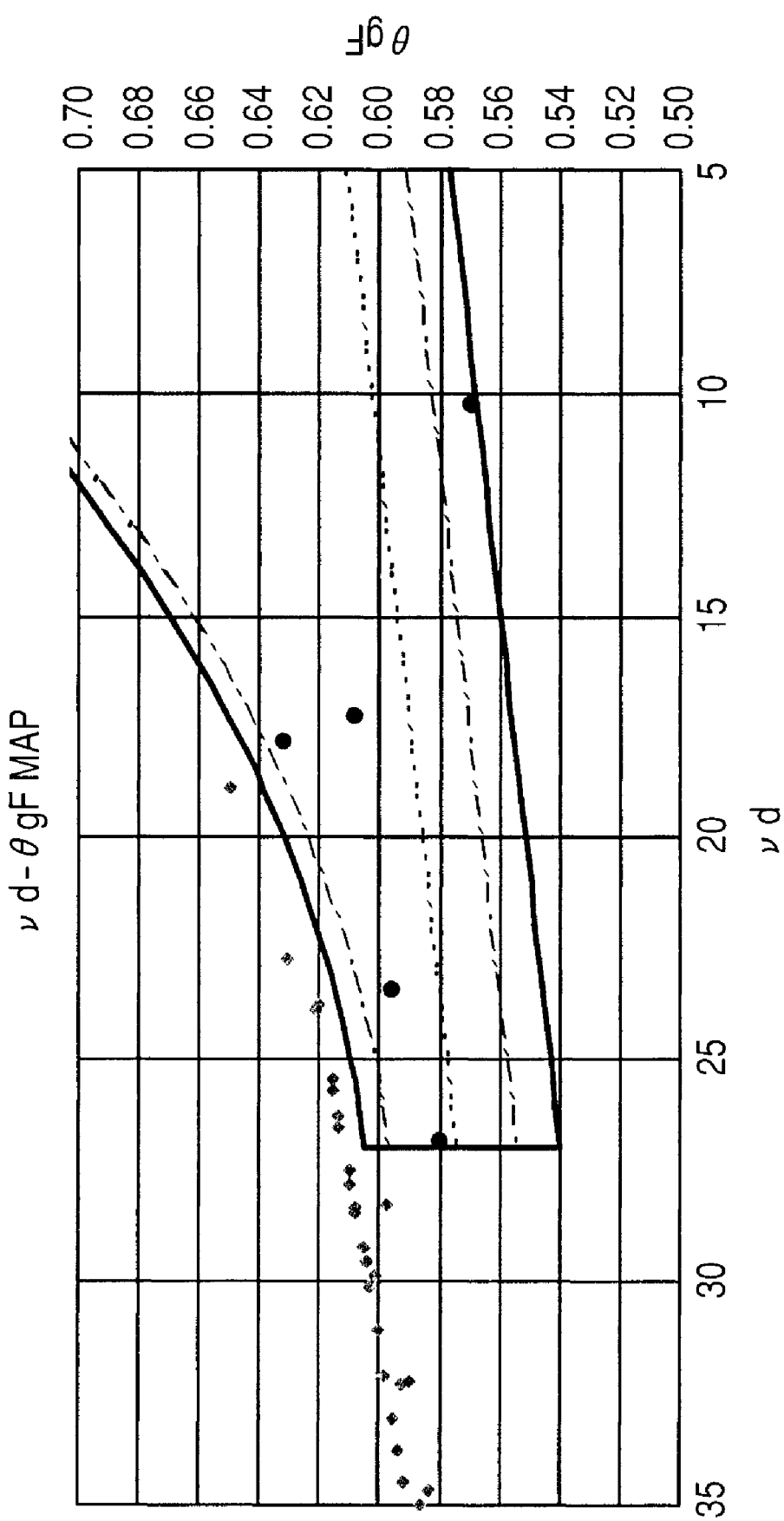
FIG. 17 is an explanatory graph illustrating a relationship between an Abbe number (vd) and a partial dispersion ratio (θgF).
Figure 18:
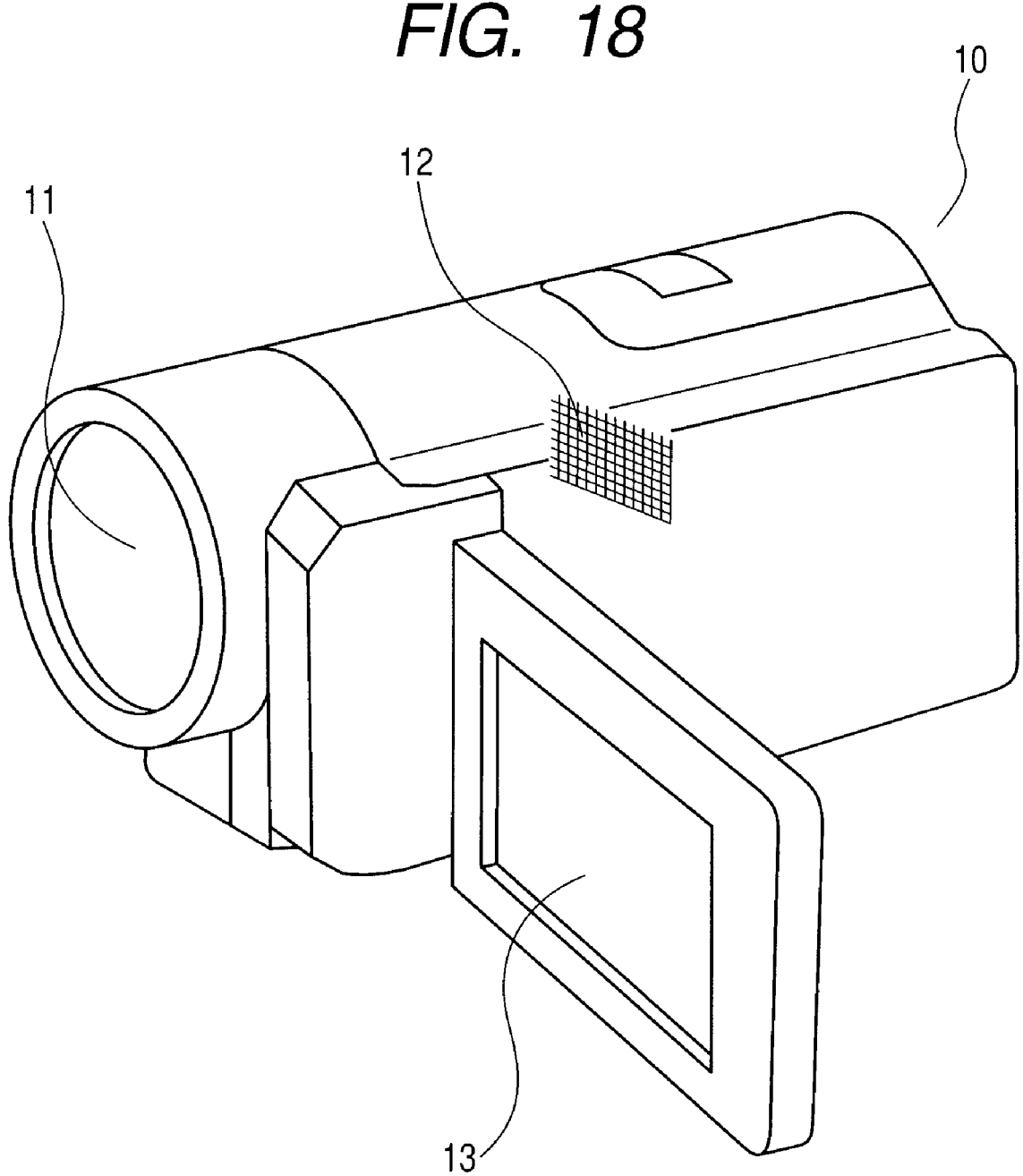
FIG. 18 is a principal schematic view illustrating an image pickup apparatus according to the present invention.
Figure 19:
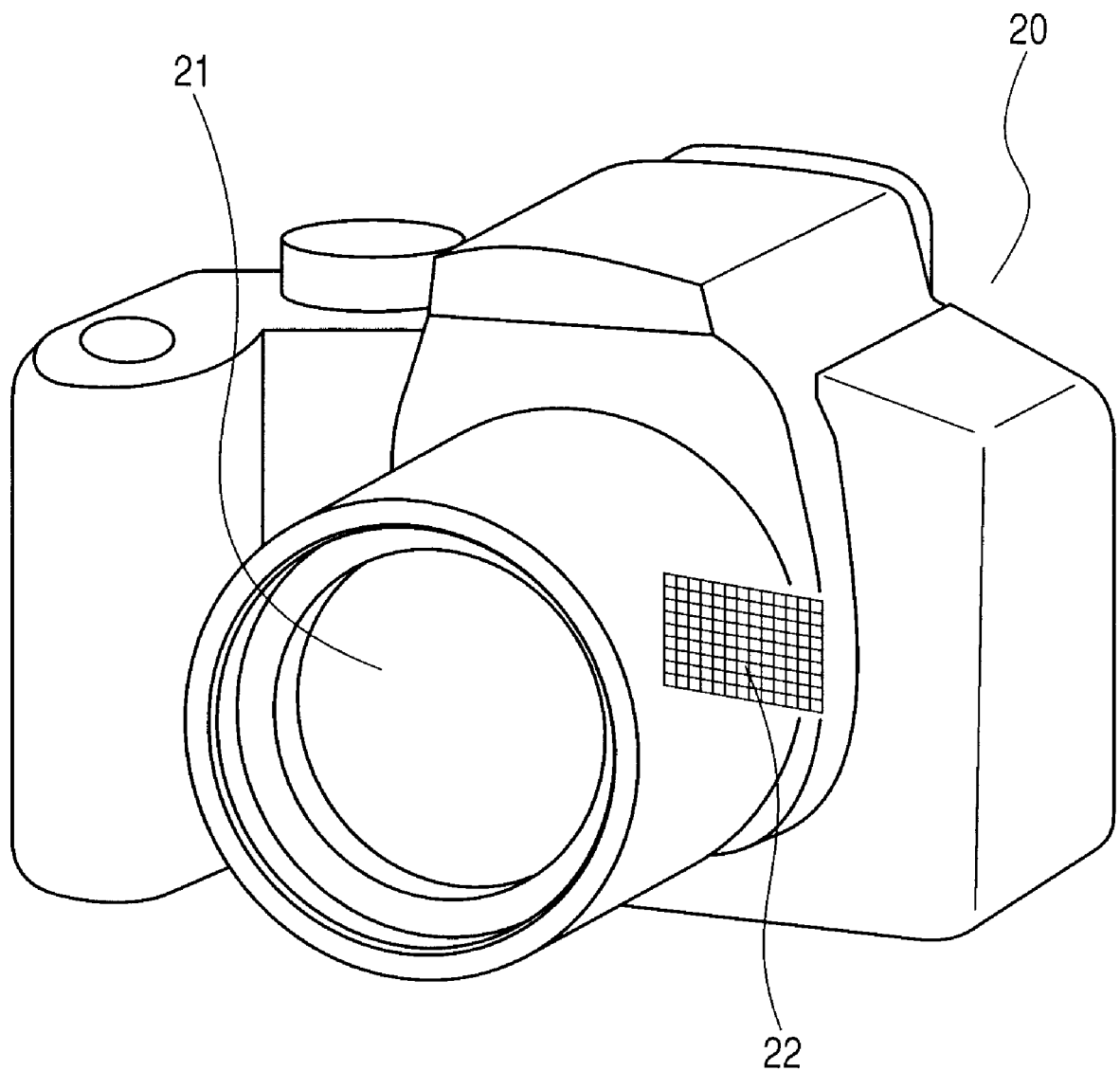
FIG. 19 is a principal schematic view illustrating an image pickup apparatus according to the present invention.

FIG. 9 is a lens cross sectional view illustrating a zoom lens system according to Embodiment 5 of the present invention at a wide angle end. FIGS. 10A, 10B, and 10C are aberration graphs in the zoom lens system according to Embodiment 5 at the wide angle end, an intermediate zoom position, and the telephoto end, respectively. FIG. 11 is a lens cross sectional view illustrating a zoom lens system according to Embodiment 6 of the present invention at the wide angle end. FIGS. 12A, 12B, and 12C are aberration graphs in the zoom lens system according to Embodiment 6 at the wide angle end, the intermediate zoom position, and the telephoto end, respectively. FIG. 13 is a lens cross sectional view illustrating a zoom lens system according to Embodiment 7 of the present invention at the wide angle end. FIGS. 14A, 14B, and 14C are aberration graphs in the zoom lens system according to Embodiment 7 at the wide angle end, the intermediate zoom position, and the telephoto end, respectively. FIG. 15 is a lens cross sectional view illustrating a zoom lens system according to Embodiment 8 of the present invention at the wide angle end. FIGS. 16A, 16B, and 16C are aberration graphs in the zoom lens system according to Embodiment 8 at the wide angle end, the intermediate zoom position, and the telephoto end, respectively. FIG. 17 is an explanatory graph illustrating a relationship between an Abbe number vd and a partial dispersion ratio θgF. FIG. 18 is a principal schematic view illustrating a video camera (image pickup apparatus) to which any of the zoom lens systems according to the present invention is applied. FIG. 19 is a principal schematic view illustrating a digital camera (image pickup apparatus) to which any of the zoom lens systems according to the present invention is applied.

The zoom lens system according to each of the embodiments is an image taking lens system used for an image pickup apparatus such as a video camera, a digital camera, a silver-halide film camera, or a TV camera. The zoom lens system according to each of the embodiments may be used as a projection optical system for a projection apparatus (projector). In the lens cross sectional views, the left is the object side (front side) and the right is the image side (rear side). In the lens cross sectional views, when a lens unit number counted from the object side is represented by "i", an i-th lens unit is represented by Bi. A rear lens group LR includes two or more lens units. An aperture stop SP is provided. An optical block G corresponds to an optical filter, a face plate, a low-pass filter, or an infrared cut filter. When the zoom lens system is used as the image taking optical system of the video camera or the digital camera, the image plane IP corresponds to an image pickup surface of a solid-state image pickup element (photoelectric transducer) such as a CCD sensor or a CMOS sensor. When the zoom lens system is used as the image taking optical system of the silver-halide film camera, the image plane IP corresponds to a film surface. Arrows indicate movement loci of the respective lens units during zooming (magnification varying) from the wide angle end to the telephoto end.

In the aberration graphs, spherical aberrations relate to four wavelengths (d-line, g-line, C-line, and F-line). Astigmatisms relate to the d-line (587.56 nm in wavelength) and the g-line (435.835 nm in wavelength). In the astigmatisms, M(d) and S(d) represent a meridional image plane and a sagittal image plane for the d-line and M(g) and S(g) represent a meridional image plane and a sagittal image plane for the g-line. Lateral chromatic aberrations relate to the g-line. A half angle of field is represented by ω and an F-number is represented by Fno. In the following respective embodiments, the wide angle end and the telephoto end correspond to zoom positions in cases where a lens unit for varying magnification is located in each of both ends of a range in which the lens unit is movable on the optical axis in view of mechanisms.

In each of the embodiments, the zoom lens system includes a first lens unit B1 having a positive refractive power, a second lens unit B2 having a negative refractive power, and the rear lens group LR including a lens unit having a positive refractive power, which are provided in order of from the object side to the image side. During zooming, the lens units are moved as illustrated by arrows. In particular, during zooming, an interval between the first lens unit B1 and the second lens unit B2 changes. In Embodiments 1 to 3, 7, and 8, the rear lens group LR includes a third lens unit B3 having a positive refractive power and a fourth lens unit B4 having a positive refractive power. In Embodiments 4 and 6, the rear lens group LR includes the third lens unit B3 having a positive refractive power, the fourth lens unit B4 having a negative refractive power, and a fifth lens unit B5 having a positive refractive power.

In Embodiment 5, the rear lens group LR includes the third lens unit B3 having a negative refractive power and the fourth lens unit B4 having a positive refractive power. In each of the embodiments, the number of lens units included in the rear lens group LR and the refractive power of each of the lens units are arbitrary and the rear lens group LR desirably includes at least two lens units. In each of the embodiments, in order to ensure a high zoom ratio (high magnification-varying ratio) and excellently correct aberrations, a lens unit having a positive refractive power and a lens unit having a negative refractive power are provided in order of from the object side to the image side. In each of the embodiments, the first lens unit B1 includes at least one negative lens. An Abbe number $vd1n$ and a partial dispersion ratio $\theta gF1n$ of a material of the at least one negative lens included in the first lens unit B1 satisfy the following conditions.

$$-1.68\times10^{-3}\times vd1n+0.585<\theta gF1n<3.15\times10^{-4}\times vd1n^2-1.86\times10^{-2}\times vd1n+0.878 \quad (1)$$

$$5<vd1n<27 \quad (2)$$

Conditional Expressions (1) and (2) specify the Abbe number $vd1n$ and the partial dispersion ratio $\theta gF1n$ of the material of the at least one negative lens included in the first lens unit B1. When refractive indices with respect to the d-line, the F-line, the C-line, and the g-line of Fraunhofer lines are represented by Nd, NF, NC, and Ng, the Abbe number $vd$ and the partial dispersion ratio $\theta gF$ of a material are defined as follows.

$$vd=(Nd-1)/(NF-NC)$$

$$\theta gF=(Ng-NF)/(NF-NC)$$

In each of the embodiments, the first lens unit B1 includes at least one negative lens made of a material satisfying both Conditional Expressions (1) and (2). Therefore, the secondary spectrum is excellently corrected.

FIG. 17 is the graph illustrating the relationship between the Abbe number $vd$ and the partial dispersion ratio $\theta gF$ of the material and a solid line indicates a boundary between Conditional Expressions (1) and (2). The abscissa indicates the Abbe number $vd$ and the ordinate indicates the partial dispersion ratio $\theta gF$.

Conditional Expression (1) relates to the condition for specifying the partial dispersion ratio of the material of the at least one negative lens included in the first lens unit B1. The material satisfying Conditional Expression (1) has anomalous dispersion. A material which does not satisfy the condition of Conditional Expression (1) is not desirable because anomalous dispersion necessary to reduce the secondary spectrum is low.

An example of the material satisfying Conditional Expression (1) includes a material containing 20 mol % or more of tellurium dioxide ($TeO_2$). As compared with an optical element composed of a replica layer made of a resin or the like, the material may have an environmental resistance, ease of manufacturing, a small limit on an optical element thickness, and a strong refractive power. The material is excellent in environmental resistance with respect to moisture and temperature and has sufficient hardness, and hence the negative lens may be provided closest to the object side. The numerical range of Conditional Expression (1) is more desirably set as expressed by Conditional Expression (1a). This is more desirable because a refractive index of a glass material is easily increased and a correction effect for various aberrations becomes larger.

$$-1.68\times10^{-3}\times vd1n+0.600<\theta gF1n<3.15\times10^{-4}\times vd1n^2-1.86\times10^{-2}\times vd1n+0.878 \quad (1a)$$

The numerical range of Conditional Expression (1) is more desirably set as expressed by Conditional Expression (1b).

$$-1.68\times10^{-3}\times vd1n+0.620<\theta gF1n<3.15\times10^{-4}\times vd1n^2-1.86\times10^{-2}\times vd1n+0.878 \quad (1b)$$

The numerical range of Conditional Expression (1) is more desirably set as expressed by Conditional Expression (1c).

$$-1.68\times10^{3}\times vd1n+0.620<\theta gF1n<3.15\times10^{-4}\times vd1n^2-1.86\times10^{-2}\times vd1n+0.800 \quad (1c)$$

Conditional Expression (2) relates to the condition for specifying the Abbe number of the material of the at least one negative lens included in the first lens unit B1. When the Abbe number becomes larger so that the upper limit of Conditional Expression (2) is not satisfied, dispersion is too small, and hence it is difficult to correct primary chromatic aberration generated in a positive lens included in the first lens unit B1. The numerical range of Conditional Expression (2) is more desirably set as expressed by Conditional Expression (2a) described below. If the Conditional Expression (2a) is satisfied, it is easy to correct the primary chromatic aberration.

$$10<vd1n<27 \quad (2a)$$

The numerical range of Conditional Expression (2) is more desirably set as expressed by Conditional Expression (2b).

$$15 < \nu d1n < 27 \tag{2b}$$

The numerical range of Conditional Expression (2) is more desirably set as expressed by Conditional Expression (2c).

$$15 < \nu d1n < 25 \tag{2c}$$

In Embodiments 1 to 6, a first lens provided closest to the object side has anomalous dispersion. In Embodiment 7, a first lens and a second lens as counted from the object side have anomalous dispersion. In Embodiment 8, a first lens and a third lens as counted from the object side have anomalous dispersion. In particular, in each of the embodiments, a lens structure having a positive refractive power and a negative refractive power in order from the object side to the image side is provided to realize a zoom lens system having a high zoom ratio and a small size. A structure in which the material of the at least one negative lens of the first lens unit has high dispersion and anomalous dispersion is provided to reduce the secondary spectrum on the telephoto side. When the at least one negative lens of the first lens unit satisfies Conditional Expressions (1) and (2), the generation of lateral chromatic aberration at the wide angle end may be reduced, and hence the second lens unit and the subsequent lens units are easily reduced in size.

In each of the embodiments, in order to obtain a high-zoom ratio and small-size zoom lens system in which various aberrations such as axial chromatic aberration, lateral chromatic aberration, and spherical aberration are excellently corrected, one or more of the following various conditions is desirably satisfied. A focal length of the at least one negative lens of the first lens unit B1 is represented by $f1n$. A focal length of the first lens unit B1 and a focal length of the second lens unit B2 are represented by $f1$ and $f2$, respectively. A focal length of the zoom lens system at the wide angle end and a focal length thereof at the telephoto end are represented by $fW$ and $fT$, respectively.

The F-number at the telephoto end is represented by $FnoT$. A thickness of the at least one negative lens of the first lens unit B1 on an optical axis is represented by $t1n$. A minimum thickness among thicknesses of lenses of the second lens unit B2 on the optical axis is represented by $t2min$. A Knoop hardness of the material of the at least one negative lens of the first lens unit B1 is represented by $HK1n$. A minimum Knoop hardness among Knoop hardnesses of lens materials of the second lens unit B2 is represented by $HK2min$.

In this case, one or more of the following conditions is desirably satisfied.

$$0.9 < |f1n|/f1 < 70.0 \tag{3}$$

$$5.0 < fT/|f2| < 25.0 \tag{4}$$

$$0.3 < f1/fT < 10.0 \tag{5}$$

$$3.2 < (fT/fW)/FnoT < 15.0 \tag{6}$$

$$1.65 < Nd1n < 2.50 \tag{7}$$

$$3.0 < f1/|f2| < 10.0 \tag{8}$$

$$0.8 < t1n/t2min < 5.0 \tag{9}$$

$$0.5 < HK1n/HK2min \tag{10}$$

Conditional Expression (3) is an expression for specifying the focal length of the at least one negative lens having high dispersion and anomalous dispersion in the first lens unit B1. When the focal length of the negative lens having high dispersion and anomalous dispersion is too long so that upper limit of Conditional Expression (3) is not satisfied, that is, when the refractive power of the negative lens is too weak so that the upper limit of Conditional Expression (3) is not satisfied, primary chromatic aberration of the first lens unit B1 is insufficiently corrected, and hence a chromatic aberration variation during zooming remains. This is not desirable. In contrast to this, in order to sufficiently correct the primary chromatic aberration of the first lens unit B1, it is necessary to lengthen a total length of the entire system, and hence it is difficult to achieve a reduction in size. When the focal length of the negative lens is too short so that the lower limit of the condition of Conditional Expression (3) is not satisfied, that is, when the refractive power of the negative lens is too strong so that lower limit of the condition of Conditional Expression (3) is not satisfied, a Petzval sum becomes larger on a negative side to increase a field curvature. This is not desirable. In addition, it is difficult to suppress higher-order spherical aberration and chromatic spherical aberration in the first lens unit B1. This is not desirable.

The numerical range of Conditional Expression (3) is desirably set as expressed by the following Conditional Expression (3a) described below. Therefore, it is easy to correct the spherical aberration at the telephoto end.

$$0.9 < |f1n|/f1 < 10.0 \tag{3a}$$

The numerical range of Conditional Expression (3) is more desirably set as expressed by Conditional Expression (3b).

$$1.0 < |f1n|/f1 < 5.0 \tag{3b}$$

Conditional Expression (4) specifies the focal length of the entire system at the telephoto end based on the focal length of the second lens unit B2. When the focal length of the second lens unit B2 becomes smaller so that the upper limit of Conditional Expression (4) is not satisfied, it is easy to realize a high zoom ratio and shorten the entire lens length. However, a Petzval sum becomes larger in a negative direction to increase a field curvature. This is not desirable. When the focal length of the second lens unit B2 becomes larger so that lower limit of Conditional Expression (4) is not satisfied, it is necessary to increase an movement amount of the second lens unit B2 or improve a magnification-varying action of the rear lens group provided in the image-side of the second lens unit B2 in order to realize the high zoom ratio. When the movement amount of the second lens unit B2 is increased, the entire lens length lengthens. This is not desirable. When the magnification-varying action of the rear lens group provided in the image-side of the second lens unit B2 is improved, the total length of the entire lens system lengthens to increase the number of lenses. This is not desirable. The numerical range of Conditional Expression (4) is desirably set as expressed by the following Conditional Expression (4a). Therefore, it is easy to suppress the field curvature and astigmatism over the entire zoom range. This is desirable.

$$7.0 < fT/|f2| < 20.0 \tag{4a}$$

Conditional Expression (5) specifies the focal length of the entire system at the telephoto end based on the focal length of the first lens unit B1. When the focal length of the first lens unit B1 is too long so that upper limit of Conditional Expression (5) is not satisfied, it is difficult to correct the spherical aberration at the telephoto end, and hence it is necessary to correct the spherical aberration by the rear lens group provided in the image-side of the second lens unit B2. Therefore, the number of lenses of the rear lens group increases. This is not desirable. When the focal length of the first lens unit B1 is too short so that the lower limit of Conditional Expression (5)

is not satisfied, the chromatic aberration increases at the telephoto end. This is not desirable. The numerical range of Conditional Expression (5) is desirably set as expressed by the following Conditional Expression (5a). Therefore, it is easy to correct the spherical aberration and reduce the size of the entire system.

$$0.4 < f1/fT < 5.0 \quad (5a)$$

Conditional Expression (6) specifies a ratio between the focal length of the entire system at the wide angle end and the focal length of the entire system at the telephoto end based on the F-number at the telephoto end. When the F-number at the telephoto end is too large so that the upper limit of Conditional Expression (6) is not satisfied, it is easy to correct the spherical aberration and the axial chromatic aberration at the telephoto end to obtain high imaging performance. However, the image plane variation caused by the stop increases. This is not desirable. When the F-number at the telephoto end becomes smaller so that the lower limit of Conditional Expression (6) is not satisfied, it is necessary to increase the number of lenses of the first lens unit B1 in order to correct the spherical aberration at the telephoto end. Therefore, the size of the first lens unit B1 increases in a diameter direction. With the increase in size in the diameter direction, a flare component of an off-axial beam increases over the entire zoom range. This is not desirable.

When the material of the negative lens has a high refractive index so that the upper limit of Conditional Expression (7) is not satisfied, a curvature radius of the lens surface becomes larger, and hence it is difficult to correct various aberrations, in particular, correct spherical aberration at the wide angle end. When the material of the negative lens has a low refractive index so that the lower limit of Conditional Expression (7) is not satisfied, the curvature radius of the lens surface is reduced to provide a predetermined refractive power, and hence it is difficult to correct astigmatism. This is not desirable. It is also difficult to reduce the size of the entire system. The numerical range of Conditional Expression (7) is desirably set as expressed by the following Conditional Expression (7a). Therefore, it is easy to further reduce the size of the entire system.

$$1.8 < Nd1n < 2.4 \quad (7a)$$

Conditional Expression (8) is used to suitably set the focal length of the second lens unit B2, to thereby maintain an appropriate magnification-varying ratio and correct a Petzval sum. When the upper limit of Conditional Expression (8) is not satisfied, variations in aberrations of the first lens unit B1 and the second lens unit B2 during zooming are large, and hence it is difficult to correct particularly the field curvature. When the lower limit of Conditional Expression (8) is not satisfied, the movement amount of the second lens unit B2 becomes larger to realize the high zoom ratio and the entire lens length and the size in the diameter direction increase. This is not desirable.

The numerical range of Conditional Expression (8) is more desirably set as expressed by the following Conditional Expression (8a).

$$4.0 < |f1/f2| < 7.0 \quad (8a)$$

Conditional Expression (9) is defined for the at least one negative lens of the first lens unit B1 to correct chromatic aberration and excellently correct spherical aberration and coma. When the upper limit of Conditional Expression (9) is not satisfied, the negative lens of the first lens unit B1 becomes larger in size relative to the lens system. This is not desirable. When the lower limit of Conditional Expression (9) is not satisfied, it is difficult to ensure the negative refractive power of the negative lens of the first lens unit B1 and obtain a correction effect for spherical aberration and coma at the telephoto end. The numerical range of Conditional Expression (9) is more desirably set as expressed by the following Conditional Expression (9a).

$$0.9 < t1n/t2min < 4.0 \quad (9a)$$

Conditional Expression (10) specifies a deformation caused by an environment in which external forces are applied or by self-weight and tightening of glass. In Conditional Expression (10), the Knoop hardness is one of scales indicating hardnesses of industrial materials. A Knoop hardness HK is calculated by dividing an indentation surface area by an applied test force.

$$HK = \frac{P}{C_P L^2}$$

where
$L^2$=indentation surface area (in mm$^2$)
$C_p$=correction coefficient (=0.070279)
P=weight (in kgf).

When the lower limit of Conditional Expression (10) is not satisfied, mechanical performance is insufficient. When the at least one negative lens of the first lens unit B1 is located closest to the subject side, deformation or distortion may occur. This is not desirable. The rear lens group LR desirably includes at least one aspherical lens.

In order to set the F-number at the wide angle end to a relatively small value and simplify the lens structure of the rear lens group, it is desirable to provide an aspherical surface. A resultant refractive power of the rear lens group LR is desirably positive. When the resultant refractive power of the rear lens group LR is made positive, high optical performance may be achieved.

The rear lens group LR desirably includes the third lens unit B3 having a positive refractive power. Therefore, it is easy to ensure a desired zoom ratio, shorten the entire lens length, and simplify the lens system. A structure in which a lens included in the third lens unit B3 has an aspherical surface is desirable because excellent imaging performance may be maintained even when a diameter ratio is large.

As described above, according to each of the embodiments, when the structures of the respective lens units are suitably set, the zoom lens system having the high zoom ratio and high imaging performance is obtained.

Next, the lens structures of the zoom lens systems according to the respective embodiments are described. In Embodiments 1, 2, 7, and 8 illustrated in FIGS. 1, 3, 13, and 15, during zooming from the wide angle end to the telephoto end, as illustrated by the arrows, the second lens unit B2 is moved to the image side to perform magnification varying. An image plane variation due to the magnification varying is corrected by moving the fourth lens unit B4 along a locus convex to the object side. The zoom lenses are of rear focus type in which the fourth lens unit B4 is moved on the optical axis to perform focusing. A solid curve 4a and a broken curve 4b with respect to the fourth lens unit B4 exhibit movement loci for correcting image plane variations due to magnification varying during focusing on an infinite-distance object and during focusing on a near object, respectively. The fourth lens unit B4 is moved along the locus convex to the object side as described above, and hence the interval between the third lens unit B3 and the fourth lens unit B4 is used to effectively shorten the entire lens length. During focusing from the infinite-distance object to the near object, the fourth lens unit is moved to the object side.

In Embodiments 1, 2, 7, and 8, during zooming, the first lens unit B1 and the third lens unit B3 are held to set the number of movable lens units of the entire system to two. Therefore, the entire lens length may be maintained constant during zooming. The aperture stop SP does not move during zooming. Therefore, an actuator for moving the aperture stop SP is unnecessary, and hence the structure may be simplified.

The first lens unit B1, the third lens unit B3, and the aperture stop SP do not move in the optical axis direction during zooming and focusing, but may be moved if necessary in order to excellently correct aberrations.

In Embodiment 3 illustrated in FIG. 5, during zooming from the wide angle end to the telephoto end, as illustrated by arrows, the first lens unit B1 moves to the object side and the second lens unit B2 moves to the image side. The third lens unit B3 nonlinearly moves to the object side. The fourth lens unit B4 moves along a locus convex to the object side to correct an image plane variation due to magnification varying. The aperture stop SP moves along a locus convex to the object side. The fourth lens unit B4 is moved on the optical axis to perform focusing.

In a case of focusing from the infinite-distance object to the near object at the telephoto end, as illustrated by an arrow 4c, the fourth lens unit B4 is moved to the object side. A solid curve 4a and a broken curve 4b with respect to the fourth lens unit B4 exhibit movement loci for correcting image plane variations due to zooming from the wide angle end to the telephoto end during focusing on the infinite-distance object and during focusing on the near object, respectively. The fourth lens unit B4 which is light in weight is moved for focusing, to thereby facilitate speedy focusing. The fourth lens unit B4 is moved along the locus convex to the object side, and hence the interval between the third lens unit B3 and the fourth lens unit B4 is effectively used to effectively shorten the entire lens length. When zooming, as compared with the case of the wide angle end, in the case of the telephoto end, the first lens unit B1 moves to be located on the object side, the second lens unit B2 moves to be located on the image plane side, and the third lens unit B3 moves to be located on the object side. Therefore, the high zoom ratio is obtained while the entire lens length is shortened. The aperture stop SP is moved along the locus convex to the object side, and hence a front lens diameter is prevented from being increased in order to hold peripheral beams in the intermediate zoom position, to thereby reduce the front lens diameter.

In Embodiment 4 illustrated in FIG. 7, during zooming from the wide angle end to the telephoto end, as illustrated by arrows, the first lens unit B1 is moved to the object side and the second lens unit B2 is moved to the image side, to thereby perform main magnification varying. The third lens unit B3 and the fourth lens unit B4 move to the object side. The fifth lens unit B5 is moved along a nonlinear locus to correct a variation in image plane position due to the magnification varying. The aperture stop SP independently moves to the object side. A solid curve 5a and a broken curve 5b with respect to the fifth lens unit B5 exhibit movement loci for correcting image plane variations due to magnification varying from the wide angle end to the telephoto end during focusing on the infinite-distance object and during focusing on the near object, respectively. The fifth lens unit B5 is moved along the locus convex to the object side as described above, and hence the interval between the fourth lens unit B4 and the fifth lens unit B5 is used to effectively shorten the entire lens length.

In Embodiment 4, during focusing from the infinite-distance object to the near object, as illustrated by the line 5c in FIG. 7, the fifth lens unit B5 is moved to the object side.

In Embodiment 5 illustrated in FIG. 9, during zooming from the wide angle end to the telephoto end, the second lens unit B2 is moved to the image side to perform main magnification varying. The third lens unit B3 is moved along the locus convex to the object side to correct an image plane variation due to the magnification varying. Focusing is performed by the first lens unit B1. When focusing from the infinite-distance object to the near object is to be performed, the first lens unit B1 is shifted to the object side as illustrated by an arrow F.

In Embodiment 5, during zooming, the first lens unit B1 and the fourth lens unit B4 are held to reduce the number of movable lens units of the entire system to two. Therefore, the entire lens length may be maintained constant during zooming. In Embodiment 6 illustrated in FIG. 11, during zooming from the wide angle end to the telephoto end, the respective lens units are moved as illustrated by arrows. Specifically, during zooming from the wide angle end to the telephoto end, the first lens unit B1 moves to the object side and the second lens unit B2 nonlinearly moves to the image side. The third lens unit B3 nonlinearly moves to the object side. The fourth lens unit B4 nonlinearly moves to the image side. The fifth lens unit B5 nonlinearly moves to the object side.

The aperture stop SP moves integrally with the third lens unit B3 during zooming, but may move separately therefrom or may be held. When the aperture stop SP moves integrally with the third lens unit B3, it is more likely to simplify the mechanical structure. The zoom lens is of rear focus type in which the second lens unit B2 on the optical axis moves to perform focusing. A solid curve 2a and a broken curve 2b with respect to the second lens unit B2 exhibit movement loci for correcting image plane variations due to zooming from the wide angle end to the telephoto end during focusing on the infinite-distance object and during focusing on the near object, respectively. In the respective embodiments, for example, when focusing from the infinite-distance object to the near object is to be performed at the telephoto end, the second lens unit B2 is moved to the object side as illustrated by an arrow 2c. In Embodiments 3, 4, and 6, during zooming, the respective lens units are moved to reduce the size of the lens system. Therefore, an aberration variation during zooming is suppressed.

Next, a camcorder and a digital still camera each using the zoom lens system according to any of the embodiments of the present invention as an image taking optical system are described with reference to FIGS. 18 and 19.

In FIG. 18, a camera main body 10 includes an image taking optical system 11, a solid-state image pickup element (photoelectric transducer) 12 such as a CCD sensor or a CMOS sensor and a finder 13. The image taking optical system 11 includes the zoom lens system according to any of Embodiments 1 to 8. The solid-state image pickup element 12 is incorporated in the camera main body and receives a subject image formed by the image taking optical system 11. The finder 13 includes a liquid crystal display panel or the like and is used to observe the subject image formed on the solid-state image pickup element 12.

In FIG. 19, a camera main body 20 includes an image taking optical system 21, and a solid-state image pickup element (photoelectric transducer) 22 such as a CCD sensor or a CMOS sensor. The image taking optical system includes the zoom lens system according to any of Embodiments 1 to 8. The solid-state image pickup element 22 is incorporated in the camera main body and receives a subject image formed by the image taking optical system 21.

Next, Numerical Embodiments 1 to 8 corresponding to Embodiments 1 to 8 are described. In the numerical embodiments, a surface number "i" is counted from the object side. In addition, ri represents a curvature radius of an i-th surface counted from the object side and di represents a lens thickness and an air interval between the i-th surface and an (i+1)-th surface which are counted from the object side. Further, ndi and vdi represent a refractive index and Abbe number, respectively, of a material of an i-th optical member counted from the object side. Table 1 illustrates relationships between the respective conditional expressions and the respective numerical embodiments. Assume that the optical axis direction is an X-axis, a direction perpendicular to the optical axis is an H axis, and a light traveling direction is positive. In this case, when a paraxial curvature radius is represented by R, a conic constant is represented by K, and aspherical coefficients are represented by A4 to A10, an aspherical shape is expressed by the following expression.

$$X = \frac{\frac{H^2}{R}}{1 + \sqrt{1 - (1+K)\left(\frac{H}{R}\right)^2}} + A3H^3 + A4H^4 + A5H^5 + A6H^6 + A7H^7 + A8H^8 + A9H^9 + A10H^{10} \quad \text{Equation 2}$$

The mark "*" indicates a surface having the aspherical shape. In addition, "e-x" indicates "$10^{-x}$".

Numerical Embodiment 1
Unit mm

Surface data

| Surface number | R | d | nd | vd | θgF |
|---|---|---|---|---|---|
| 1 | 43.859 | 1.15 | 1.84666 | 26.8 | 0.57997 |
| 2 | 20.643 | 4.65 | 1.60300 | 65.4 | 0.54016 |
| 3 | −520.777 | 0.20 | | | |
| 4 | 19.644 | 3.31 | 1.69680 | 55.5 | 0.54335 |
| 5 | 61.808 | (Variable) | | | |
| 6 | 48.145 | 0.60 | 1.88300 | 40.8 | 0.56672 |
| 7 | 5.099 | 2.30 | | | |
| 8 | −22.405 | 0.60 | 1.77250 | 49.6 | 0.55205 |
| 9 | 12.593 | 0.50 | | | |
| 10 | 10.103 | 1.47 | 1.92286 | 18.9 | 0.64952 |
| 11 | 50.485 | (Variable) | | | |
| 12* | 10.014 | 2.51 | 1.58313 | 59.4 | 0.54230 |
| 13 | −156.394 | 1.40 | | | |
| 14 (Stop) | ∞ | 2.30 | | | |
| 15 | 35.107 | 0.60 | 1.84666 | 23.8 | 0.62046 |
| 16 | 9.989 | 0.15 | | | |
| 17* | 11.008 | 1.85 | 1.58313 | 59.4 | 0.54230 |
| 18 | −94.159 | (Variable) | | | |
| 19 | 15.838 | 1.73 | 1.80400 | 46.6 | 0.55718 |
| 20 | −18.707 | 0.55 | 1.92286 | 18.9 | 0.64952 |
| 21 | −54.476 | (Variable) | | | |
| 22 | ∞ | 1.00 | 1.51633 | 64.1 | 0.53524 |
| 23 | ∞ | 1.00 | | | |
| Image plane | ∞ | | | | |

Aspherical data

Twelfth surface

K = −8.85802e−001    A4 = 3.56682e−005    A6 = −3.42001e−007
A8 = 5.21683e−009

-continued

Numerical Embodiment 1
Unit mm

Seventeenth surface

K = −3.29557e−002    A4 = −2.10744e−004

Various data
Zoom ratio 14.81

| | Wide angle | Intermediate | Telephoto |
|---|---|---|---|
| Focal length | 4.25 | 22.44 | 62.97 |
| F-number | 1.85 | 2.76 | 3.09 |
| Field angle | 27.88 | 5.73 | 2.05 |
| Image height | 2.25 | 2.25 | 2.25 |
| Entire lens length | 60.67 | 60.67 | 60.67 |
| BF | 8.43 | 12.33 | 5.99 |
| d5 | 0.65 | 14.91 | 19.41 |
| d11 | 19.58 | 5.32 | 0.82 |
| d18 | 6.14 | 2.25 | 8.59 |
| d21 | 6.77 | 10.67 | 4.33 |

Zoom lens unit data

| Lens unit | Most Object-side surface | Focal length |
|---|---|---|
| 1 | 1 | 30.27 |
| 2 | 6 | −5.70 |
| 3 | 12 | 16.49 |
| 4 | 19 | 16.50 |
| 5 | 22 | ∞ |

Numerical Embodiment 2
Unit mm

Surface data

| Surface number | R | d | nd | vd | θgF |
|---|---|---|---|---|---|
| 1 | 44.369 | 1.20 | 1.84660 | 23.4 | 0.59564 |
| 2 | 22.958 | 4.69 | 1.60311 | 60.6 | 0.54143 |
| 3 | −264.248 | 0.20 | | | |
| 4 | 20.207 | 2.71 | 1.69680 | 55.5 | 0.54335 |
| 5 | 51.401 | (Variable) | | | |
| 6 | 27.518 | 0.80 | 1.88300 | 40.8 | 0.55718 |
| 7 | 6.535 | 2.28 | | | |
| 8 | −17.635 | 0.60 | 1.80400 | 46.6 | 0.55718 |
| 9 | 7.145 | 0.86 | | | |
| 10 | 9.172 | 1.50 | 1.92286 | 18.9 | 0.64952 |
| 11 | 39.382 | (Variable) | | | |
| 12 (Stop) | ∞ | 1.56 | | | |
| 13* | 6.897 | 3.03 | 1.58313 | 59.4 | 0.54230 |
| 14* | −43.010 | 0.15 | | | |
| 15 | 10.827 | 0.70 | 1.84666 | 23.8 | 0.62046 |
| 16 | 6.232 | (Variable) | | | |
| 17 | 12.586 | 2.96 | 1.48749 | 70.2 | 0.53001 |
| 18 | −5.717 | 0.60 | 1.80610 | 33.3 | 0.58811 |
| 19 | −9.733 | (Variable) | | | |
| 20 | ∞ | 2.00 | 1.51633 | 64.1 | 0.53524 |
| 21 | ∞ | 1.00 | | | |
| Image plane | ∞ | | | | |

Aspherical data

Thirteenth surface

K = −5.41383e−001    A4 = −1.52169e−005    A6 = −1.89205e−007
A8 = 9.89850e−009

Fourteenth surface

K = −3.21918e+001    A4 = 2.03935e−004    A6 = −2.22126e−006

Numerical Embodiment 2
Unit mm

Various data
Zoom ratio 19.98

| | Wide angle | Intermediate | Telephoto |
|---|---|---|---|
| Focal length | 3.62 | 9.89 | 72.39 |
| F-number | 1.85 | 2.20 | 3.50 |
| Field angle | 28.89 | 11.43 | 1.58 |
| Image height | 2.00 | 2.00 | 2.00 |
| Entire lens length | 61.21 | 61.21 | 61.21 |
| BF | 8.96 | 11.54 | 5.17 |
| d5 | 0.55 | 10.63 | 20.72 |
| d11 | 22.22 | 12.13 | 2.05 |
| d16 | 5.64 | 3.07 | 9.43 |
| d19 | 6.64 | 9.22 | 2.85 |

Zoom lens unit data

| Lens unit | Most Object-Side surface | Focal length |
|---|---|---|
| 1 | 1 | 31.40 |
| 2 | 6 | −5.43 |
| 3 | 12 | 17.64 |
| 4 | 17 | 15.60 |
| 5 | 20 | ∞ |

Numerical Embodiment 3
Unit mm

Surface data

| Surface number | R | d | nd | vd | θgF |
|---|---|---|---|---|---|
| 1 | 65.395 | 1.50 | 2.10500 | 17.2 | 0.60817 |
| 2 | 43.930 | 4.82 | 1.49700 | 81.5 | 0.53752 |
| 3 | −104.107 | 0.20 | | | |
| 4 | 29.151 | 2.79 | 1.83481 | 42.7 | 0.56362 |
| 5 | 56.294 | (Variable) | | | |
| 6 | 41.126 | 0.90 | 1.83481 | 42.7 | 0.56362 |
| 7 | 12.363 | 4.73 | | | |
| 8 | −21.945 | 0.75 | 1.60311 | 60.6 | 0.54143 |
| 9 | 12.475 | 1.65 | | | |
| 10 | 15.369 | 1.69 | 1.92286 | 18.9 | 0.64952 |
| 11 | 31.922 | (Variable) | | | |
| 12 (Stop) | ∞ | (Variable) | | | |
| 13* | 9.798 | 3.34 | 1.58313 | 59.4 | 0.54230 |
| 14 | 81.572 | 3.98 | | | |
| 15 | 15.028 | 0.70 | 2.10500 | 17.2 | 0.60817 |
| 16 | 8.998 | 1.09 | | | |
| 17 | 78.174 | 1.35 | 1.84666 | 23.8 | 0.62046 |
| 18 | −100.308 | (Variable) | | | |
| 19 | ∞ | (Variable) | | | |
| 20 | 15.407 | 0.80 | 1.84666 | 23.8 | 0.62046 |
| 21 | 9.670 | 2.76 | 1.80400 | 46.6 | 0.55718 |
| 22 | 671.415 | (Variable) | | | |
| 23 | ∞ | 1.00 | 1.51633 | 64.1 | 0.53524 |
| 24 | ∞ | 1.50 | | | |
| Image plane | ∞ | | | | |

Aspherical data
Thirteenth surface

K = −1.04021e+000  A4 = 1.85956e−004  A6 = 3.69765e−005
A8 = 5.71959e−007  A10 = −1.88292e−009
A3 = −8.59213e−005  A5 = −1.01902e−004  A7 = −6.93498e−006

Various data
Zoom ratio 11.55

| | Wide angle | Intermediate | Telephoto |
|---|---|---|---|
| Focal length | 6.44 | 20.06 | 74.41 |
| F-number | 2.00 | 2.90 | 3.50 |
| Field angle | 29.20 | 10.18 | 2.77 |
| Image height | 3.60 | 3.60 | 3.60 |
| Entire lens length | 83.06 | 83.77 | 86.22 |
| BF | 12.26 | 15.41 | 8.58 |
| d5 | 0.80 | 15.00 | 26.46 |
| d11 | 24.77 | 8.56 | 3.00 |
| d12 | 9.20 | 6.53 | 1.45 |
| d18 | 1.16 | 2.46 | 4.31 |
| d19 | 1.81 | 2.74 | 9.36 |
| d22 | 10.10 | 13.25 | 6.42 |

Zoom lens unit data

| Lens unit | Most Object-Side surface | Focal length |
|---|---|---|
| 1 | 1 | 45.10 |
| 2 | 6 | −10.48 |
| 3 | 12 | ∞ |
| 4 | 13 | 27.64 |
| 5 | 19 | ∞ |
| 6 | 20 | 20.17 |
| 7 | 23 | ∞ |

Numerical Embodiment 4
Unit mm

Surface data

| Surface number | R | d | nd | vd | θgF |
|---|---|---|---|---|---|
| 1 | 51.857 | 1.80 | 1.84660 | 23.4 | 0.59564 |
| 2 | 37.555 | 6.12 | 1.49700 | 81.5 | 0.53752 |
| 3 | −9361.344 | 0.20 | | | |
| 4 | 37.906 | 3.22 | 1.61272 | 58.7 | 0.54485 |
| 5 | 80.273 | (Variable) | | | |
| 6 | 47.453 | 0.80 | 1.88300 | 40.8 | 0.56672 |
| 7 | 8.290 | 3.81 | | | |
| 8 | 27.180 | 0.80 | 1.88300 | 40.8 | 0.56672 |
| 9 | 16.395 | 2.25 | | | |
| 10 | −29.689 | 0.70 | 1.80610 | 33.3 | 0.58811 |
| 11 | 26.099 | 0.20 | | | |
| 12 | 18.379 | 2.40 | 1.92286 | 18.9 | 0.64952 |
| 13 | −87.594 | (Variable) | | | |
| 14 (Stop) | ∞ | (Variable) | | | |
| 15* | 7.875 | 3.20 | 1.58313 | 59.4 | 0.54230 |
| 16 | −34.469 | 1.63 | | | |
| 17 | 116.346 | 0.80 | 1.76182 | 26.5 | 0.61353 |
| 18 | 8.090 | 0.50 | | | |
| 19 | 11.124 | 0.70 | 2.00069 | 25.5 | 0.61357 |
| 20 | 5.663 | 2.70 | 1.69895 | 30.1 | 0.60291 |
| 21 | 81.297 | (Variable) | | | |
| 22 | 201.701 | 0.70 | 1.51633 | 64.1 | 0.53524 |
| 23 | 37.807 | (Variable) | | | |
| 24* | 16.564 | 2.50 | 1.58313 | 59.4 | 0.54230 |
| 25 | −114.982 | (Variable) | | | |
| 26 | ∞ | 1.00 | 1.51633 | 64.1 | 0.53524 |
| 27 | ∞ | 2.00 | | | |
| Image plane | ∞ | | | | |

Aspherical data
Fifteenth surface

K = −1.79527e−001  A4 = −1.55788e−004  A6 = −4.02659e−007
A8 = −9.95380e−008  A10 = 2.12024e−009

Numerical Embodiment 4
Unit mm

Twenty-fourth surface

K = 3.17692e+000  A4 = −1.15655e−004  A6 = −3.79021e−007
A8 = −2.08695e−008

Various data
Zoom ratio 18.56

|  | Wide angle | Intermediate | Telephoto |
| --- | --- | --- | --- |
| Focal length | 5.16 | 18.34 | 95.85 |
| F-number | 2.85 | 3.61 | 5.27 |
| Field angle | 36.88 | 11.93 | 2.32 |
| Image height | 3.88 | 3.88 | 3.88 |
| Entire lens length | 86.76 | 92.18 | 118.76 |
| BF | 10.67 | 17.14 | 12.33 |
| d5 | 0.70 | 22.07 | 41.23 |
| d13 | 27.76 | 9.82 | 3.52 |
| d14 | 8.76 | 4.72 | 2.07 |
| d21 | 1.64 | 0.95 | 5.02 |
| d23 | 2.01 | 2.24 | 19.36 |
| d25 | 8.01 | 14.48 | 9.67 |

Zoom lens unit data

| Lens unit | Most Object-side surface | Focal length |
| --- | --- | --- |
| 1 | 1 | 63.72 |
| 2 | 6 | −9.46 |
| 3 | 14 | ∞ |
| 4 | 15 | 19.45 |
| 5 | 22 | −90.25 |
| 6 | 24 | 25.00 |
| 7 | 26 | ∞ |

Numerical Embodiment 5
Unit mm

Surface data

| Surface number | R | d | nd | vd | θgF |
| --- | --- | --- | --- | --- | --- |
| 1 | 1249.461 | 2.40 | 1.84660 | 23.4 | 0.59564 |
| 2 | 106.525 | 10.60 | 1.51633 | 64.1 | 0.53524 |
| 3 | −277.435 | 0.20 | | | |
| 4 | 132.704 | 7.80 | 1.60311 | 60.6 | 0.54143 |
| 5 | −529.319 | 0.20 | | | |
| 6 | 56.525 | 6.90 | 1.67790 | 55.3 | 0.54720 |
| 7 | 152.250 | (Variable) | | | |
| 8 | 64.335 | 1.00 | 1.77250 | 49.6 | 0.55205 |
| 9 | 18.382 | 6.01 | | | |
| 10 | −23.952 | 0.90 | 1.77250 | 49.6 | 0.55205 |
| 11 | 17.007 | 4.63 | 1.84666 | 23.8 | 0.62046 |
| 12 | 144.295 | (Variable) | | | |
| 13 | −26.130 | 0.90 | 1.78800 | 47.4 | 0.55592 |
| 14 | 36.326 | 3.84 | 1.84666 | 23.8 | 0.62046 |
| 15 | −1354.707 | (Variable) | | | |
| 16 (Stop) | ∞ | 1.60 | | | |
| 17 | −1002.750 | 4.60 | 1.65844 | 50.9 | 0.55606 |
| 18 | −26.453 | 0.20 | | | |
| 19 | 213.896 | 2.53 | 1.48749 | 70.2 | 0.53001 |
| 20 | −215.067 | 0.20 | | | |
| 21 | 40.643 | 6.76 | 1.48749 | 70.2 | 0.53001 |
| 22 | −28.446 | 1.20 | 1.83400 | 37.2 | 0.57752 |
| 23 | −2366.634 | 35.00 | | | |
| 24 | 65.474 | 4.96 | 1.48749 | 70.2 | 0.53001 |
| 25 | −64.304 | 0.20 | | | |
| 26 | −139.780 | 1.20 | 1.83400 | 37.2 | 0.57752 |
| 27 | 50.625 | 6.25 | 1.48749 | 70.2 | 0.53001 |
| 28 | −34.432 | 0.20 | | | |
| 29 | 43.063 | 7.05 | 1.51742 | 52.4 | 0.55643 |
| 30 | −28.766 | 1.20 | 1.80400 | 46.6 | 0.55718 |
| 31 | 67.190 | 0.20 | | | |
| 32 | 44.873 | 3.72 | 1.54814 | 45.8 | 0.56852 |
| 33 | −993.699 | 3.86 | | | |
| 34 | ∞ | 30.00 | 1.60342 | 38.0 | 0.58349 |
| 35 | ∞ | 16.20 | 1.51633 | 64.1 | 0.53524 |
| 36 | ∞ | 6.00 | | | |
| Image plane | ∞ | | | | |

Various data
Zoom ratio 15.10

|  | Wide angle | Intermediate | Telephoto |
| --- | --- | --- | --- |
| Focal length | 10.63 | 25.62 | 160.48 |
| F-number | 2.05 | 2.20 | 2.40 |
| Field angle | 25.20 | 11.04 | 1.78 |
| Image height | 5.00 | 5.00 | 5.00 |
| Entire lens length | 217.41 | 217.41 | 217.41 |
| BF | 39.25 | 39.25 | 39.25 |
| d7 | 0.80 | 25.30 | 49.80 |
| d12 | 52.91 | 25.24 | 5.29 |
| d15 | 2.00 | 5.17 | 0.62 |

Zoom lens unit data

| Lens unit | Most Object-Side surface | Focal length |
| --- | --- | --- |
| 1 | 1 | 76.67 |
| 2 | 8 | −14.23 |
| 3 | 13 | −35.91 |
| 4 | 16 | 46.65 |

Numerical Embodiment 6
Unit mm

Surface data

| Surface number | R | d | nd | vd | θgF |
| --- | --- | --- | --- | --- | --- |
| 1 | 107.999 | 2.00 | 1.84660 | 23.4 | 0.59564 |
| 2 | 47.046 | 7.10 | 1.65160 | 58.5 | 0.54261 |
| 3 | 420.921 | 0.15 | | | |
| 4 | 41.785 | 4.57 | 1.77250 | 49.6 | 0.55205 |
| 5 | 98.031 | (Variable) | | | |
| 6 | 59.864 | 1.20 | 1.80610 | 40.9 | 0.57012 |
| 7 | 11.552 | 4.90 | | | |
| 8 | −59.265 | 1.10 | 1.80400 | 46.6 | 0.55718 |
| 9 | 27.044 | 0.12 | | | |
| 10 | 19.461 | 3.60 | 1.84666 | 23.8 | 0.62046 |
| 11 | −43.915 | 0.34 | | | |
| 12 | −32.736 | 1.10 | 1.83481 | 42.7 | 0.56362 |
| 13 | 85.194 | (Variable) | | | |
| 14 (Stop) | ∞ | 0.54 | | | |
| 15 | 25.010 | 1.10 | 1.84666 | 23.8 | 0.62046 |
| 16 | 14.218 | 3.50 | 1.51633 | 64.1 | 0.53524 |
| 17 | −103.599 | 0.15 | | | |
| 18 | 38.687 | 2.30 | 1.71300 | 53.9 | 0.54581 |
| 19 | −45.619 | (Variable) | | | |
| 20 | −32.294 | 3.10 | 1.80518 | 25.4 | 0.61608 |
| 21 | −16.435 | 1.20 | 1.80400 | 46.6 | 0.55718 |
| 22 | 172.236 | (Variable) | | | |
| 23 | 49.504 | 6.90 | 1.48749 | 70.2 | 0.53001 |
| 24 | −28.249 | 0.15 | | | |
| 25 | 70.619 | 5.00 | 1.60311 | 60.6 | 0.54143 |
| 26 | −41.413 | 3.29 | | | |
| 27* | −27.525 | 1.50 | 1.84666 | 23.8 | 0.62046 |
| 28 | −336.482 | (Variable) | | | |
| Image plane | ∞ | | | | |

Numerical Embodiment 6
Unit mm

Aspherical data
Twenty-seventh surface

K = 0.00000e+000   A4 = −1.27914e−005   A6 = 2.89752e−009
A8 = −8.58172e−011   A10 = 2.69813e−013
A3 = 1.46741e−005

Various data
Zoom ratio 4.10

|  | Wide angle | Intermediate | Telephoto |
|---|---|---|---|
| Focal length | 24.90 | 57.31 | 102.02 |
| F-number | 3.62 | 4.91 | 5.82 |
| Field angle | 40.98 | 20.68 | 11.97 |
| Image height | 21.64 | 21.64 | 21.64 |
| Entire lens length | 119.84 | 139.04 | 151.84 |
| BF | 38.50 | 46.21 | 51.35 |
| d5 | 1.40 | 19.07 | 30.10 |
| d13 | 11.05 | 4.86 | 1.49 |
| d19 | 1.43 | 8.80 | 12.79 |
| d22 | 12.56 | 5.18 | 1.19 |
| d28 | 38.50 | 46.21 | 51.35 |

Zoom lens unit data

| Lens unit | Most Object-Side surface | Focal length |
|---|---|---|
| 1 | 1 | 77.07 |
| 2 | 6 | −12.85 |
| 3 | 14 | 21.02 |
| 4 | 20 | −33.55 |
| 5 | 23 | 36.77 |

Numerical Embodiment 7
Unit mm

Surface data

| Surface number | R | d | nd | vd | θgF |
|---|---|---|---|---|---|
| 1 | 42.915 | 0.80 | 1.84660 | 23.4 | 0.59564 |
| 2 | 23.633 | 0.50 | 2.00800 | 10.2 | 0.56923 |
| 3 | 23.135 | 4.54 | 1.60311 | 60.6 | 0.54143 |
| 4 | −378.880 | 0.20 | | | |
| 5 | 20.801 | 2.70 | 1.69680 | 55.5 | 0.54335 |
| 6 | 54.133 | (Variable) | | | |
| 7 | 35.062 | 0.80 | 1.88300 | 40.8 | 0.56672 |
| 8 | 6.518 | 2.31 | | | |
| 9 | −21.225 | 0.50 | 1.77250 | 49.6 | 0.55205 |
| 10 | 7.227 | 0.88 | | | |
| 11 | 9.085 | 1.49 | 1.92286 | 18.9 | 0.64952 |
| 12 | 32.295 | (Variable) | | | |
| 13 (Stop) | ∞ | 1.56 | | | |
| 14* | 7.193 | 3.37 | 1.58313 | 59.4 | 0.54230 |
| 15* | −35.550 | 0.15 | | | |
| 16 | 11.989 | 0.70 | 1.84666 | 23.8 | 0.62046 |
| 17 | 6.706 | (Variable) | | | |
| 18 | 12.631 | 3.00 | 1.48749 | 70.2 | 0.53001 |
| 19 | −5.729 | 0.60 | 1.80610 | 33.3 | 0.58811 |
| 20 | −9.788 | (Variable) | | | |
| 21 | ∞ | 2.00 | 1.51633 | 64.1 | 0.53524 |
| 22 | ∞ | 1.00 | | | |
| Image plane | ∞ | | | | |

Aspherical data
Fourteenth surface

K = −5.68472e−001   A4 = −1.47503e−005   A6 = −3.14527e−007
A8 = −3.33402e−009

Numerical Embodiment 7
Unit mm

Fifteenth surface

K = −1.97217e+001   A4 = 2.05875e−004   A6 = −2.87688e−006

Various data
Zoom ratio 19.94

|  | Wide angle | Intermediate | Telephoto |
|---|---|---|---|
| Focal length | 3.63 | 9.85 | 72.40 |
| F-number | 1.85 | 2.20 | 3.50 |
| Field angle | 28.85 | 11.48 | 1.58 |
| Image height | 2.00 | 2.00 | 2.00 |
| Entire lens length | 61.83 | 61.83 | 61.83 |
| BF | 8.84 | 11.42 | 5.19 |
| d6 | 0.55 | 10.80 | 21.05 |
| d12 | 22.55 | 12.30 | 2.05 |
| d17 | 5.79 | 3.21 | 9.44 |
| d20 | 6.52 | 9.10 | 2.87 |

Zoom lens unit data

| Lens unit | Most Object-Side surface | Focal length |
|---|---|---|
| 1 | 1 | 31.85 |
| 2 | 7 | −5.50 |
| 3 | 13 | 17.64 |
| 4 | 18 | 15.72 |
| 5 | 21 | ∞ |

Numerical Embodiment 8
Unit mm

Surface data

| Surface number | R | d | nd | vd | θgF |
|---|---|---|---|---|---|
| 1 | 44.412 | 1.20 | 1.84666 | 23.8 | 0.62046 |
| 2 | 22.580 | 4.38 | 1.60311 | 60.6 | 0.56923 |
| 3 | −2093.893 | 0.20 | | | |
| 4 | 22.190 | 0.55 | 2.00800 | 10.2 | 0.56923 |
| 5 | 21.577 | 2.62 | 1.76735 | 49.6 | 0.56115 |
| 6 | 64.083 | (Variable) | | | |
| 7 | 44.076 | 0.80 | 1.88300 | 40.8 | 0.56672 |
| 8 | 6.320 | 2.08 | | | |
| 9 | −24.266 | 0.50 | 1.79909 | 47.1 | 0.56561 |
| 10 | 7.611 | 0.80 | | | |
| 11 | 9.198 | 1.52 | 1.92286 | 18.9 | 0.64952 |
| 12 | 38.947 | (Variable) | | | |
| 13 (Stop) | ∞ | 1.56 | | | |
| 14* | 7.024 | 3.36 | 1.58313 | 59.4 | 0.54230 |
| 15* | −44.323 | 0.15 | | | |
| 16 | 11.237 | 0.70 | 1.84666 | 23.8 | 0.62046 |
| 17 | 6.476 | (Variable) | | | |
| 18 | 12.608 | 3.04 | 1.48749 | 70.2 | 0.53001 |
| 19 | −5.630 | 0.60 | 1.80610 | 33.3 | 0.58811 |
| 20 | −9.706 | (Variable) | | | |
| 21 | ∞ | 2.00 | 1.51633 | 64.1 | 0.53524 |
| 22 | ∞ | 1.00 | | | |
| Image plane | ∞ | | | | |

Aspherical data
Fourteenth surface

K = −5.35812e−001   A4 = −9.25135e−006   A6 = −2.55624e−007
A8 = −3.52289e−009

Fifteenth surface

K = −4.04570e+001   A4 = 2.09662e−004   A6 = −2.84336e−006

-continued

Numerical Embodiment 8
Unit mm

Various data
Zoom ratio 19.94

|  | Wide angle | Intermediate | Telephoto |
|---|---|---|---|
| Focal length | 3.63 | 9.89 | 72.40 |
| F-number | 1.85 | 2.20 | 3.50 |
| Field angle | 28.85 | 11.43 | 1.58 |
| Image height | 2.00 | 2.00 | 2.00 |
| Entire lens length | 61.88 | 61.88 | 61.88 |
| BF | 8.83 | 11.44 | 5.18 |
| d6 | 0.55 | 10.91 | 21.28 |
| d12 | 22.78 | 12.41 | 2.05 |
| d17 | 5.66 | 3.05 | 9.31 |
| d20 | 6.51 | 9.12 | 2.86 |

Zoom lens unit data

| Lens unit | Most Object-Side surface | Focal length |
|---|---|---|
| 1 | 1 | 32.02 |
| 2 | 7 | −5.55 |
| 3 | 13 | 17.64 |
| 4 | 18 | 15.77 |
| 5 | 21 | ∞ |

What is claimed is:

1. A zoom lens system, comprising, in order from an object side to an image side:
   a first lens unit having a positive refractive power;
   a second lens unit having a negative refractive power; and
   a rear lens group including a lens unit having a positive refractive power, wherein:
   at least one of the first lens unit and the second lens unit is moved for zooming so that an interval between the first lens unit and the second lens unit at a telephoto end is larger than an interval between the first lens unit and the second lens unit at a wide angle end;
   the first lens unit includes at least one negative lens; and
   the following conditions are satisfied:

$-1.68 \times 10^{-3} \times vd1n + 0.585 < \theta gF1n < 3.15 \times 10^{-4} \times vd1n^2 - 1.86 \times 10^{-2} \times vd1n + 0.878$; and $5 < vd1n < 27$ where $vd1n$ and $\theta gF1n$ represent an Abbe number and a partial dispersion ratio of a material of the at least one negative lens, respectively.

2. A zoom lens system according to claim 1, wherein the following condition is satisfied $0.9 < |f1n|/f1 < 70.0$ where $f1n$ represents a focal length of the at least one negative lens of the first lens unit and $f1$ represents a focal length of the first lens unit.

TABLE 1

Values corresponding to Conditional Expressions associated with Embodiments

| Conditional Expression | | 1 | 2 | 3 | 4 | 5 | 6 | 7 | 8 |
|---|---|---|---|---|---|---|---|---|---|
|  | fW | 4.252 | 3.624 | 6.443 | 5.164 | 10.328 | 24.903 | 3.630 | 3.631 |
|  | fT | 62.968 | 72.393 | 74.407 | 95.848 | 160.480 | 102.023 | 72.399 | 72.397 |
| (1), (2) | vd1n | 26.8 | 23.4 | 17.2 | 23.4 | 23.4 | 23.4 | 23.4 | 23.4 |
|  | θgF1n | 0.5800 | 0.5956 | 0.6082 | 0.5956 | 0.5956 | 0.5956 | 0.5956 | 0.5956 |
|  | vd1n |  |  |  |  |  |  | 10.2 | 10.2 |
|  | θgF1n |  |  |  |  |  |  | 0.5692 | 0.5692 |
|  | f1n | −47.133 | −57.675 | −125.735 | −170.698 | −137.686 | −99.967 | −63.333 | −55.656 |
|  |  |  |  |  |  |  |  | −2195.1 | −1410.8 |
|  | f2 | −5.704 | −5.425 | −10.481 | −9.461 | −14.232 | −12.855 | −5.503 | −5.550 |
|  | f1 | 30.272 | 31.399 | 45.096 | 63.719 | 76.673 | 77.075 | 31.854 | 32.015 |
|  | FnoT | 3.090 | 3.500 | 3.500 | 5.269 | 2.400 | 5.824 | 3.500 | 3.500 |
| (7) | Nd1n | 1.84666 | 1.84660 | 2.10500 | 1.84660 | 1.84660 | 1.84660 | 1.84660 | 1.84660 |
|  |  |  |  |  |  |  |  | 2.00800 | 2.00800 |
|  | t1n | 1.150 | 1.200 | 1.500 | 1.800 | 2.400 | 2.000 | 0.800 | 1.200 |
|  |  |  |  |  |  |  |  | 0.500 | 0.550 |
|  | t2min | 0.600 | 0.600 | 0.750 | 0.700 | 0.900 | 1.100 | 0.500 | 0.500 |
| (3) | |f1n|/f1 | 1.557 | 1.837 | 2.788 | 2.679 | 1.796 | 1.297 | 1.988 | 1.738 |
|  |  |  |  |  |  |  |  | 68.911 | 44.067 |
| (4) | fT/|f2| | 11.040 | 13.344 | 7.099 | 10.131 | 11.276 | 7.937 | 13.156 | 13.045 |
| (5) | f1/fT | 0.481 | 0.434 | 0.606 | 0.665 | 0.478 | 0.755 | 0.440 | 0.442 |
| (6) | (fT/fW)/FnoT | 4.792 | 5.708 | 3.300 | 3.522 | 6.292 | 0.703 | 5.698 | 2.697 |
| (8) | f1/|f2| | 5.307 | 5.788 | 4.302 | 6.735 | 5.387 | 5.996 | 5.788 | 5.769 |
| (9) | t1n/t2min | 1.917 | 2.000 | 2.000 | 2.571 | 2.667 | 1.818 | 1.600 | 2.400 |
|  |  |  |  |  |  |  |  | 1.000 | 1.100 |
| (10) | HK1n/HK2min | 1.2 | 1.2 | 1.0 | 1.2 | 1.0 | 1.0 | 0.9 | 1.2 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-085555, filed on Mar. 31, 2009, which is hereby incorporated by reference herein in its entirety.

3. A zoom lens system according to claim 1, wherein the following condition is satisfied $5.0 < fT/|f2| < 25.0$ where fT represents a focal length of the zoom lens system at the telephoto end and f2 represents a focal length of the second lens unit.

4. A zoom lens system according to claim 1, wherein the following condition is satisfied $0.3 < f1/fT < 10.0$ where fT represents a focal length of the zoom lens system at the telephoto end and f1 represents a focal length of the first lens unit.

5. A zoom lens system according to claim 1, wherein the following condition is satisfied $$3.2 < (fT/fW)/FnoT < 15.0$$

where fW represents a focal length of the zoom lens system at the wide angle end, fT represents a focal length of the zoom lens system at the telephoto end, and FnoT represents an F-number of the zoom lens system at the telephoto end.

6. A zoom lens system according to claim 1, wherein the following condition is satisfied $$1.65 < Nd1n < 2.50$$

where Nd1n represents a refractive index of the material of the at least one negative lens of the first lens unit.

7. A zoom lens system according to claim 1, wherein the following condition is satisfied $$3.0 < f1/|f2| < 10.0$$

where f1 represents a focal length of the first lens unit and f2 represents a focal length of the second lens unit.

8. A zoom lens system according to claim 1, wherein the following condition is satisfied $$0.8 < t1n/t2min < 5.0$$

where t1n represents a thickness of the at least one negative lens of the first lens unit on an optical axis and t2min represents a thickness of a lens whose thickness is the smallest among thicknesses of lenses included in the second lens unit on the optical axis.

9. A zoom lens system according to claim 1, wherein the following condition is satisfied $$0.5 < HK1n/HK2min$$

where HK1n represents a Knoop hardness of the material of the at least one negative lens of the first lens unit and HK2min represents a Knoop hardness of a material of a lens whose Knoop hardness is the smallest among Knoop hardnesses of materials of lenses included in the second lens unit.

10. A zoom lens system according to claim 1, wherein the rear lens group comprises a third lens unit having a positive refractive power and a fourth lens unit having a positive refractive power, which are provided in order from the object side to the image side.

11. A zoom lens system according to claim 1, wherein the rear lens group comprises a third lens unit having a negative refractive power and a fourth lens unit having a positive refractive power, which are provided in order from the object side to the image side.

12. A zoom lens system according to claim 1, wherein the rear lens group comprises a third lens unit having a positive refractive power, a fourth lens unit having a negative refractive power, and a fifth lens unit having a positive refractive power, which are provided in order from the object side to the image side.

13. A zoom lens system according to claim 1, which forms an image on a photoelectric transducer.

14. An image pickup apparatus, comprising:
the zoom lens system according to claim 1; and
a photoelectric transducer for receiving an image formed by the zoom lens system.

* * * * *